(12) United States Patent
Mueller et al.

(10) Patent No.: US 7,841,514 B2
(45) Date of Patent: Nov. 30, 2010

(54) DIGITAL ADVERTISEMENT BOARD IN COMMUNICATION WITH POINT-OF-SALE TERMINALS

(75) Inventors: Raymond J. Mueller, Weston, CT (US); Andrew S. Van Luchene, Santa Fe, NM (US)

(73) Assignee: Walker Digital, LLC, Stamford, CT (US)

( * ) Notice: Subject to any disclaimer, the term of this patent is extended or adjusted under 35 U.S.C. 154(b) by 620 days.

(21) Appl. No.: 11/456,306

(22) Filed: Jul. 10, 2006

(65) Prior Publication Data

US 2006/0235755 A1 Oct. 19, 2006

Related U.S. Application Data

(63) Continuation of application No. 10/770,385, filed on Feb. 2, 2004, now abandoned, and a continuation-in-part of application No. 10/403,184, filed on Mar. 28, 2003, now abandoned.

(60) Provisional application No. 60/444,520, filed on Jan. 31, 2003, provisional application No. 60/369,108, filed on Mar. 29, 2002.

(51) Int. Cl.
*G06K 19/00* (2006.01)
*G06Q 20/00* (2006.01)

(52) U.S. Cl. .................... 235/378; 235/385; 705/20

(58) Field of Classification Search .................. 705/15, 705/16, 20; 235/375, 377, 378, 383, 385
See application file for complete search history.

(56) References Cited

U.S. PATENT DOCUMENTS

| | | | |
|---|---|---|---|
| 3,573,747 A | 4/1971 | Adams et al. | |
| 4,008,792 A | 2/1977 | Levasseur et al. | |
| 4,108,361 A | 8/1978 | Krause | |
| 4,237,537 A | 12/1980 | Pitches et al. | |
| 4,245,730 A | 1/1981 | Bachmann et al. | |
| 4,282,575 A | 8/1981 | Hoskinson et al. | |
| 4,323,770 A | 4/1982 | Dieulot et al. | |
| 4,412,292 A | 10/1983 | Sedam | |
| 4,494,197 A | 1/1985 | Troy et al. | |
| 4,498,570 A | 2/1985 | King et al. | |
| 4,500,880 A | 2/1985 | Gomersall et al. | |
| 4,593,361 A | 6/1986 | Otten | |
| 4,654,800 A | 3/1987 | Hayashi et al. | |

(Continued)

FOREIGN PATENT DOCUMENTS

CH   612024 A5   6/1979

(Continued)

OTHER PUBLICATIONS

Brochure: "For the Crew & the Customer; The Best Drive-Thru & Grill Service", Ollvetti North America, 2 pp.

(Continued)

*Primary Examiner*—Andrew Joseph Rudy
(74) *Attorney, Agent, or Firm*—Fincham Downs, LLC; Michael D. Downs

(57) ABSTRACT

A price associated with a menu item is determined automatically based at least in part on revenue management information. A menu display is updated on an electronic display device such as a digital menu board to include the automatically-determined price.

9 Claims, 17 Drawing Sheets

| PLU NUMBER | PLU TYPE | ITEM DESCRIPTOR | PRICE A | TIME A | PRICE B | TIME B |
|---|---|---|---|---|---|---|
| 305 | 310 | 315 | 320 | 325 | 330 | 335 |
| PLU001 | SIDE | SMALL FRY | $0.89 | 11:00 AM - 3:00 PM | $0.99 | 4:00 PM - 11:00 PM |
| PLU002 | DRINK | SMALL COLA | $0.99 | 11:00 AM - 3:00 PM | $1.09 | 4:00 PM - 11:00 PM |
| PLU003 | SANDWICH | HAMBURGER | $1.09 | 11:00 AM - 3:00 PM | $1.19 | 4:00 PM - 11:00 PM |
| PLU004 | COMBO | 2 SMALL FRY, 2 DRINKS, 2 HAMBURGERS | $7.00 | 11:00 AM - 3:00 PM | $7.50 | 4:00 PM - 11:00 PM |

300

U.S. PATENT DOCUMENTS

| | | |
|---|---|---|
| 4,669,730 A | 6/1987 | Small |
| 4,677,553 A | 6/1987 | Roberts et al. |
| 4,679,150 A | 7/1987 | Hayashi et al. |
| 4,689,742 A | 8/1987 | Troy et al. |
| 4,697,242 A | 9/1987 | Holland et al. |
| 4,723,212 A | 2/1988 | Mindrum et al. |
| 4,760,247 A | 7/1988 | Keane et al. |
| 4,766,548 A | 8/1988 | Cedrone et al. |
| 4,815,741 A | 3/1989 | Small |
| 4,825,045 A | 4/1989 | Humble |
| 4,839,507 A | 6/1989 | May |
| 4,854,590 A | 8/1989 | Joliff et al. |
| 4,859,838 A | 8/1989 | Okiharu |
| 4,876,592 A | 10/1989 | Von Kohorn |
| 4,882,473 A | 11/1989 | Bergeron et al. |
| 4,902,880 A | 2/1990 | Garczynski et al. |
| 4,908,761 A | 3/1990 | Tai |
| 4,910,672 A | 3/1990 | Off et al. |
| 4,922,522 A | 5/1990 | Scanlon |
| 4,935,877 A | 6/1990 | Koza |
| 4,937,853 A | 6/1990 | Brule et al. |
| 4,973,952 A | 11/1990 | Malec et al. |
| 4,981,027 A | 1/1991 | Friedman et al. |
| 4,982,337 A | 1/1991 | Burr et al. |
| 4,993,714 A | 2/1991 | Golightly |
| 5,025,372 A | 6/1991 | Burton et al. |
| 5,053,957 A | 10/1991 | Suzuki |
| 5,056,019 A | 10/1991 | Schultz et al. |
| 5,091,713 A | 2/1992 | Home et al. |
| 5,119,295 A | 6/1992 | Kapur |
| 5,128,862 A | 7/1992 | Mueller |
| 5,132,914 A | 7/1992 | Cahlander et al. |
| 5,136,686 A | 8/1992 | Koza et al. |
| 5,148,513 A | 9/1992 | Koza et al. |
| 5,159,560 A | 10/1992 | Newell et al. |
| 5,168,445 A | 12/1992 | Kawahima et al. |
| 5,172,328 A | 12/1992 | Cahlander et al. |
| 5,173,851 A | 12/1992 | Off et al. |
| 5,177,342 A | 1/1993 | Adams |
| 5,192,854 A | 3/1993 | Counts |
| 5,201,010 A | 4/1993 | Deaton et al. |
| 5,216,595 A | 6/1993 | Protheroe |
| 5,223,698 A | 6/1993 | Kapur |
| 5,231,569 A | 7/1993 | Myatt et al. |
| 5,235,509 A | 8/1993 | Mueller et al. |
| 5,239,165 A | 8/1993 | Novak |
| 5,243,515 A | 9/1993 | Lee |
| 5,245,533 A | 9/1993 | Marshall |
| 5,256,863 A | 10/1993 | Ferguson et al. |
| 5,257,179 A | 10/1993 | DeMar |
| 5,262,941 A | 11/1993 | Saladin et al. |
| 5,267,452 A | 12/1993 | Zinsmeyer et al. |
| 5,274,547 A | 12/1993 | Zoffel et al. |
| 5,282,731 A | 2/1994 | Lalonde et al. |
| 5,287,268 A | 2/1994 | McCarthy |
| 5,297,026 A | 3/1994 | Hoffman |
| 5,297,031 A | 3/1994 | Gutterman et al. |
| 5,297,032 A * | 3/1994 | Trojan et al. ............ 705/37 |
| 5,302,195 A | 4/1994 | Murphy |
| 5,302,811 A | 4/1994 | Fukatsu |
| 5,309,355 A | 5/1994 | Lookwood |
| 5,327,508 A | 7/1994 | Deaton et al. |
| 5,339,250 A | 8/1994 | Durbin |
| 5,339,392 A * | 8/1994 | Risberg et al. ............ 715/762 |
| 5,353,218 A | 10/1994 | De Lapa et al. |
| 5,353,219 A | 10/1994 | Mueller et al. |
| 5,367,452 A | 11/1994 | Gallery et al. |
| 5,371,796 A | 12/1994 | Avarne |
| 5,380,991 A | 1/1995 | Valencia et al. |
| RE034,915 E | 4/1995 | Nichtberger et al. |
| 5,420,606 A | 5/1995 | Begum et al. |
| 5,450,938 A | 9/1995 | Rademacher |
| 5,452,344 A | 9/1995 | Larson |
| 5,459,306 A | 10/1995 | Stein |
| 5,481,094 A | 1/1996 | Suda |
| 5,502,636 A | 3/1996 | Clarke |
| 5,504,475 A | 4/1996 | Houdou et al. |
| 5,504,675 A | 4/1996 | Cragun et al. |
| 5,510,979 A | 4/1996 | Moderi et al. |
| 5,539,189 A | 7/1996 | Wilson |
| 5,564,546 A | 10/1996 | Molbak et al. |
| 5,572,653 A | 11/1996 | DeTemple et al. |
| 5,576,951 A | 11/1996 | Lockwood |
| 5,581,064 A | 12/1996 | Riley et al. |
| 5,583,763 A | 12/1996 | Atcheson et al. |
| 5,592,375 A | 1/1997 | Salmon et al. |
| 5,592,376 A | 1/1997 | Hodroff |
| 5,592,560 A | 1/1997 | Deaton et al. |
| 5,602,377 A | 2/1997 | Beller et al. |
| 5,611,052 A | 3/1997 | Dykstra et al. |
| 5,612,868 A | 3/1997 | Off et al. |
| 5,613,620 A | 3/1997 | Center et al. |
| 5,615,269 A | 3/1997 | Micali |
| 5,619,558 A | 4/1997 | Jheeta |
| 5,620,079 A | 4/1997 | Molbak |
| 5,621,201 A | 4/1997 | Langhans et al. |
| 5,621,640 A | 4/1997 | Burke |
| 5,621,812 A | 4/1997 | Deaton et al. |
| 5,632,010 A | 5/1997 | Briechle et al. |
| 5,638,457 A | 6/1997 | Deaton et al. |
| 5,642,484 A | 6/1997 | Harrison, III et al. |
| 5,642,485 A | 6/1997 | Deaton et al. |
| 5,644,723 A | 7/1997 | Deaton et al. |
| 5,649,114 A | 7/1997 | Deaton et al. |
| 5,652,421 A | 7/1997 | Venneman et al. |
| 5,664,115 A | 9/1997 | Fraser |
| 5,665,953 A | 9/1997 | Mazzamuto et al. |
| 5,687,322 A | 11/1997 | Deaton et al. |
| 5,701,252 A | 12/1997 | Facchin et al. |
| 5,708,782 A | 1/1998 | Larson et al. |
| 5,710,887 A | 1/1998 | Chelliah et al. |
| 5,717,866 A | 2/1998 | Naftzger |
| 5,724,886 A | 3/1998 | Ewald et al. |
| 5,734,823 A | 3/1998 | Saig et al. |
| 5,754,938 A | 5/1998 | Herz et al. |
| 5,774,868 A | 6/1998 | Cragun et al. |
| 5,793,281 A | 8/1998 | Long |
| 5,822,735 A | 10/1998 | De Lapa et al. |
| 5,822,736 A | 10/1998 | Hartman et al. |
| 5,826,240 A | 10/1998 | Brockman et al. |
| 5,832,457 A | 11/1998 | O'Brien et al. |
| 5,839,115 A * | 11/1998 | Coleman ............ 705/15 |
| 5,839,117 A | 11/1998 | Cameron et al. |
| 5,845,259 A | 12/1998 | West et al. |
| 5,857,175 A | 1/1999 | Day et al. |
| 5,870,030 A | 2/1999 | DeLuca et al. |
| 5,873,069 A * | 2/1999 | Reuhl et al. ............ 705/20 |
| 5,890,718 A | 4/1999 | Byon |
| 5,899,980 A | 5/1999 | Wilf et al. |
| 5,924,077 A | 7/1999 | Beach et al. |
| 5,946,665 A | 8/1999 | Suzuki et al. |
| 5,969,968 A * | 10/1999 | Pentel ............ 705/26 |
| 5,988,346 A | 11/1999 | Tedesco et al. |
| 5,997,928 A | 12/1999 | Kaish et al. |
| 5,999,914 A | 12/1999 | Blinn et al. |
| 6,003,258 A | 12/1999 | Godfrey et al. |
| 6,009,426 A | 12/1999 | Jouenne |
| 6,012,834 A | 1/2000 | Dueck et al. |
| 6,014,634 A | 1/2000 | Scroggie et al. |
| 6,021,394 A | 2/2000 | Takahashi et al. |

| | | | |
|---|---|---|---|
| 6,038,545 | A | 3/2000 | Mandeberg et al. |
| 6,055,513 | A * | 4/2000 | Katz et al. ..................... 705/26 |
| 6,058,304 | A | 5/2000 | Callaghan et al. |
| 6,061,691 | A * | 5/2000 | Fox ......................... 707/104.1 |
| 6,064,987 | A | 5/2000 | Walker et al. |
| 6,070,147 | A | 5/2000 | Harms et al. |
| 6,076,070 | A | 6/2000 | Stack |
| 6,085,164 | A | 7/2000 | Smith et al. |
| 6,085,171 | A | 7/2000 | Leonard |
| 6,088,682 | A | 7/2000 | Burke |
| 6,112,191 | A | 8/2000 | Burke |
| 6,119,099 | A | 9/2000 | Walker et al. |
| 6,138,105 | A | 10/2000 | Walker et al. |
| 6,208,976 | B1 * | 3/2001 | Kinebuchi et al. ............ 705/15 |
| 6,223,163 | B1 | 4/2001 | Van Luchene |
| 6,226,651 | B1 | 5/2001 | Masuda et al. |
| 6,230,150 | B1 | 5/2001 | Walker et al. |
| 6,267,670 | B1 | 7/2001 | Walker et al. |
| 6,298,329 | B1 | 10/2001 | Walker et al. |
| 6,298,331 | B1 | 10/2001 | Walker et al. |
| 6,330,542 | B1 | 12/2001 | Sevcik et al. |
| 6,341,268 | B2 * | 1/2002 | Walker et al. ................. 705/15 |
| 6,435,407 | B1 | 8/2002 | Fiordelisi |
| 6,449,599 | B1 | 9/2002 | Payne et al. |
| 6,480,861 | B1 | 11/2002 | Kanevsky et al. |
| 7,036,072 | B1 | 4/2006 | Sulistio et al. |
| 7,130,816 | B2 | 10/2006 | Morimoto |
| 7,149,726 | B1 | 12/2006 | Lingle et al. |
| 7,162,443 | B2 | 1/2007 | Shah |
| 7,213,005 | B2 | 5/2007 | Mourad et al. |
| 7,277,870 | B2 | 10/2007 | Mourad et al. |
| 7,398,319 | B2 | 7/2008 | McIntyre et al. |
| 2002/0082950 | A1 * | 6/2002 | Anderson et al. ............. 705/27 |

FOREIGN PATENT DOCUMENTS

| | | |
|---|---|---|
| DE | 4037689 A | 6/1992 |
| EP | 0085546 A2 | 8/1983 |
| EP | 0109189 A1 | 5/1984 |
| EP | 512413 A | 11/1992 |
| EP | 0780788 A2 | 6/1997 |
| EP | 0817 138 A1 | 1/1998 |
| JP | 5242363 A | 9/1993 |
| JP | 5266326 A | 10/1993 |
| JP | 8147545 A | 6/1996 |
| JP | 409016836 A | 1/1997 |
| KR | 9502496 B | 3/1995 |
| WO | WO 96/36023 A | 11/1996 |
| WO | WO 96/36926 | 11/1996 |
| WO | WO 97/28510 | 8/1997 |
| WO | WO 97/35441 | 9/1997 |
| WO | WO 97/46961 | 12/1997 |
| WO | WO 97/50064 | 12/1997 |
| WO | WO 99/11006 | 3/1999 |
| WO | WO 99/19809 | 4/1999 |
| WO | WO 99/22328 | 5/1999 |
| WO | WO 99/46706 | 9/1999 |

OTHER PUBLICATIONS

Brochure, "Introducing the Digital MenuBoard", Siren Technologies, Inc., (www sirentech com), 4 pp.
Brochure: "It's in the Bag. Introducing the Universal Holding Cabinet from Welbilt.", Welbilt, 5 pp.
Brochure, "Reaching Out in New Directions", First Data Corp., undated, 32 pp.
"Universal Holding Cabinet Rollout Program", H & K Dallas Inc., 5 pp.
Brochure: "POSitive Input; The McDonald's POS-3 System Newsletter from Olivetti Solutions/OLSY", 8 pp.
"New Wave Marketing", Promotion Times; An SCA Quarterly Newsletter - First Quarter, 2 pp.
"Cape Town", Reuters Ltd, Nov. 8, 1979, PM Cycle, 1 pg.

"Save the Mark", Financial Times (London), Feb. 1, 1983, Section: Section I; Men & Matters, 1 pg.
Cook, Louise, "ConsumerWatch: Clip, Snip, Save", The Associated Press, Mar. 12, 1984, 2 pp. Business News.
"Major Appliances: Tappan unveils microwave oven featuring preprogrammed controls.", HFD, Sep. 10, 1984, 1 pg.
Greene, Jan, "Farm bills please assns; National Grocers Association", Supermarket News, Dec. 23, 1985, Section: vol. 35, 1 pg.
"POS spectrum: a lottery looks to POS for growth", UMI, Inc., POS News, Jan. 1989, vol. 5, No. 7, 1 pg.
Kuttner, Robert, "Computers May Turn the World Into One Big Commodities Pit", Business Week, Sep. 11, 1989, 2 pp.
Schrage, Michael, "An Experiment In Economic Theory; Labs Testing Real Markets", The Record, Nov. 26, 1989, 3 pp.
"Let's Play the Cash Register Receipts Lottery", The New York Times, Dec. 25, 1990, Section 1, 1 pg.
Nakayama, Atsushi, "Coca-Cola machines to be 'smarter'", The Japan Economic Journal, Feb. 23, 1991, Section: Industry: Chemicals, 2 pp.
Del Rosso, Laura, "Marketel says it plans to launch air fare 'auction' in June; Marketel International Inc.", Travel Weekly, Apr. 29, 1991, 3 pp.
"Philips offers customers financing through Citicorp; Philips Medical Systems North America, Citicorp North America Inc." Health Industry Today, Jun. 1991, 1 pg.
Pelline, Jeff, "Travelers Bidding On Airline Tickets SF firm offers chance for cut-rate fares" The San Francisco Chronicle, Aug. 19, 1991, 5 pp.
Antonoff, Michael, "Genetic algorithms: software by natural selection . . . ", Popular Science, Oct. 1991, vol. 239, 4 pp.
Del Rosso, Laura, "Ticket-bidding firm closes its doors; Marketel International; Brief Article", Travel Weekly, Mar. 12, 1992, 2 pp.
"Heads I win, tails you lose", The Economist, Jun. 13, 1992, Section: Business, finance and science, Business, 2 pp.
"Coupons get serious; supermarkets use barcodes to prevent misredemptions", Chain Store Age Executive with Shopping Center Age, Oct. 1992, 2 pp.
"Winn-Dixie/The Salvation Army Report Contributions For War Against Hunger", PR Newswire, Jun. 10, 1993, 1 pg.
Goodstein, Ronald C., "UPC scanner pricing systems: Are they accurate?", Journal of Marketing, Apr. 1994, Journal of Marketing, vol. 58, No. 2, 17 pp.
Jones, Jeanne, "Data Readers Streamline Management; Scanner Technology Aids Retailers As Well As Plants, Wholesalers", 4 pp.
Fiorini, Phillip, "'No Place for Penny?'/Smallest coin doesn't make cents to some", USA Today, Jul. 29, 1994, 3 pp.
Smith, Alison, "Survey of UK Consumer Credit and Asset Finance", Financial Times, Nov. 3, 1994, 3 pp.
Andreoli, Tom et al., "Cash Machines Offer A Whole Lotto Money for Withdrawl . . . ", Crain's Chicago Business, Jun. 19, 1995, 2 pp.
"Spain: BBV launches new card", Cards International, Jun. 22, 1995, 1 pg.
Knippenberg, Jim, "Will local radio empires strike back?", The Cincinnati Enquirer, Jul. 23, 1995, 1 pg.
Stankevich, Garbato, Debby, "Cook's Warehouse sets heavy-gauge nonstick.", HFN The Weekly Newspaper for the Home Furnishing Network, Aug. 14, 1995, 2 pp.
Silverman, Gene, "Planning and using infomercial campaigns effectively.", Direct Marketing, Sep. 1995, vol. 58, No. 5, 4 pp.
Brochure, "Cyber Bid", Net Fun Ltd., Copyright 1996, 9 pp.
Maras, Elliot, "Software opens doors to scientific machine menuing", Automatic Merchandiser, Feb. 1996, 5 pp.
Koselka, Rita, "The new mantra: MVT", Forbes, Mar. 11, 1996, 6 pp.
McKinney, Jeff, "Merchant program could pay off for Provident", The Cincinnati Enquirer, Mar. 24, 1996, Section: Financial, p. E02, 2 pp.
Raab, David M., "Package Aids Catalog Management", DM News, Apr. 22, 1996, Section: Software Review, 2 pp.
Steinberg, Carol, "Rising stars: the hottest new franchise companies; nine companies profiled", Success, Jun. 1996, Section: No. 5, vol. 43, 7 pp.
Johnson, Colin R., "Genetic program auto-designs analog circuits", Electronic Engineering Times, Jun. 3, 1996, 3 pp.

Normile, Dennis, "Artificial life gets real as scientists meet in Japan. A-Life Meeting Briefs", Science, Jun. 28, 1996, 3 pp.

Hadley, Kimberly, "Pastors praying anti-arson effort will burn bias", The Nashville Banner, Jul. 26, 1996, 1 pg.

Gapper, John, "NatWest reports rise in bad debt", Financial Times, Jul. 31, 1996, Section: News: UK; 1 pg.

Gilbert, Allan Z., "A call to action for wireless data communications", Automatic Merchandiser, Aug. 1996, 3 pp.

Johnson, Colin R., "Genetic programming evolves", Electronic Engineering Times, Aug. 5, 1996. 3 pp.

"Lynx Technology: Lynx to provide business leasing programme through Schroder Leasing", M2 Presswire, Aug. 9, 1996, 2 pp.

Rodwin, Marc A., "Consumer protection and managed care: The need for organized consumers", Health Affairs, Fall 1996, Section: vol. 15, No. 3, 11 pp.

Taylor, Paul, "Towards a dream market", Financial Times (London), Sep. 4, 1996, Section: Survey - FT IT; 2 pp.

"Bigger Plans (Provident Bank, issuer of MeritValue customer loyalty card, plans to offer program in 25 cities in six months", Card Fax, Oct. 7, 1996, vol. 96, No. 178, 1 pg.

Fickenscher, Lisa, "Amex to Start Free Rewards Program with Discounts on Merchandise", The American Banker, Oct. 18, 1996, Section: Credit/Debit/ATMs, 2 pg.

Fitzgerald, Kate, "Amex Program Moves Loyalty to Next Level: Custom Extras Finds a Medium Customers Can't Ignore: Billing Statements", Advertising Age, Nov. 4, 1996, 2 pp.

Bonnici, Joseph et al., "Consumer issues in coupon usage: An exploratory analysis", Journal of Applied Business Research, Winter 1996/1997, 11 pp.

Rehayem, Gilbert, "Opinion: X-Press Betting", Information Systems & Technology, Ontario Lottery Corp., Feb. 7, 1997, 1 pg.

Quittner, Jeremy, "Ohio's Provident brings its discount card to Fla.", American Banker, Feb. 11, 1997, 2 pp.

Symons, Allene, "Lucky, Sav-on Debut Rewards Card.", Drug Store News, Feb. 17, 1997, vol. 19, 2 pp.

Mckeveny, Alexander, "Giving them a good reason.", Bank Marketing, Mar. 1997, vol. 29, Issue 3, p. 37, 5 pp.

Kennedy, Doug, "Train front desk staff in sales; hotel industry", Hotel & Motel Management, Mar. 3, 1997, 3 pp.

Singletary, Michelle, "Electronic World, Unchecked Problem? U.S. Move to Paperless Payments Raises Worries About Those Who Don't Use Banks", The Washington Post, Mar. 4, 1997, 4 pp.

Kelsey, John and Schneier, Bruce, "Conditional Purchase Orders", Fourth ACM Conference on Computer Communication Security, Apr. 1997, ACM Press, 8 pp.

"Dispensing the future", Electronic Payments International, May 1997, 5 pp.

"Avco Financial Services", National Home Furnishing Association, (http //www homefurnish comNHFA/avco htm), download date: May 23, 1997, 2 pp.

Website, "Catalina Marketing Corporation", (http //catalinamktg com/prodcdir htm), download date: May 29, 1997. 12 pp.

"Industry Briefs", Card News, Jun. 9, 1997, 2 pp.

Riordan, Teresa, "Patents; A novel approach to making a better spermicide harks back to some old-fashioned methods", The New York Times, Jun. 9, 1997, 3 pp.

Nairn, Geoff, "The key to your identity: Falling costs will allow fingerprint verification to be widely used, reports Geoff Nairn", Financial Times (London), Jul. 15, 1997, 3 pp.

"The United Computer Exchange, How It All Works", (http //www uce com/howitworks html), download date: Jul. 23, 1997, 6 pp.

"Classified 2000: The Internet Classifieds", Classifieds2000, Inc., (http //www classifieds2000 com/cgi-cls/Display exe?C2K+aboutus), download date: Aug. 6, 1997, 3 pp.

"General trading information and terms provided by tradingfloor. com", (http //www tradingfloor com/info htm), download date: Aug. 14, 1997. 11 pp.

"NASDAQ", Information Sheet, (http //home axford com/corfin/ corfll htm), download date: Aug. 15, 1997, 3 pp.

Prochaska-Cue, Kathy, "Acquiring Credit", (http //ianrwww unl edu/ IANR/PUBS/NEBFACTS/NF91-2 Htm), download date: Sep. 3, 1997, 4 pp.

Website: "About IAO", (http www iaoauction com/about htm), download date: Sep. 8, 1997, 10 pp.

Hoeschen, Brad, "Brookfield Square hopes mall card strikes a chord", Business Journal- Milwaukee, Sep. 12, 1997, 2 pp.

Website, "NCR 7452 Workstation", (http //www ncr com/products/ retail/products/catalogs/7452 shtm), download date: Sep. 23, 1997, 3 pp.

Niccolai, James, "Vending machines to stay stocked, thanks to SAP, Digital", Infoworld, Oct. 27, 1997, 1 pg.

Craig, Andrew, "SAP, Digital try to eliminate empty vending machines", InternetWeek, Nov. 3, 1997, 2 pp.

Kirk, Jim, "Digital promotions make quick point", Chicago Tribune, Dec. 26, 1997, 2 pp.

Brochure: "NCR 7453 PC-Based Point-of-Sale Solution", NCR Corporation, Copyright 1998, 2 pp.

"Progressive Introduces Kitchen Display System (KDS) For Restaurants", PR NewsWire, Jan. 23, 1998, 1 pg.

"From Our Family to Yours . . . 5 Weeks of Coupon Values for a Valuable Customer!", Wakefern Food Corporation, Feb. 1998, 1 pg.

Hirschfeld, David, "Increasing Profits Through Automation", VendMaster, (http //www vendmaster com/news_main html), download date: Feb. 6, 1998, 10 pp.

Website: "Reports", VendMaster, (http //www vendmaster com/ reports_main html), download date: Feb. 6, 1998. 13 pp.

Blair, Adam, "JICC Coupon Guide Recommends Upgrades At Front End", Supermarket News, Feb. 9, 1998, Section: p. 23, ISSN: 0039-5803.

Livingston, Kimball, "In-Store systems", RT, Mar. 1998, (www retailtech com), pp. 29-30.

Website: "Advanced Mechanics Internet Specials", (http //www metroplexweb com/advcpn2 htm), download date: Mar. 12, 1998.

Website: "U.P.C. Coupon Code Guidelines Manual", Uniform Code Council, Inc., (http //www uc- council org/d31-3 htm), download date: Mar. 12, 1998.

Website: "Windows for Vending PRO", VendMaster, (http //www vendmaster com/pro_main html), download date: Mar. 16, 1998.

Website: "Windows for Vending PRO with Inventory", VendMaster, (http //www vendmaster com/pro_inv_main html), download date: Mar. 16, 1998.

Website: "Skywire Software Information Page", (http //www skywire com/sftwr_3 htm), download date: Mar. 26, 1998.

Hamstra, Mark, "'Made-for-you' maneuvers signal competitive shift in QSR category", Segment Study Quickserve, Apr. 13, 1998, (http //www nm com).

Website: "Onsale", (http www onsale com/about htm), download dates: Oct. 14, 1998 and Oct. 15, 1998.

Hartnett, Michael, "Lowe's Uses Multi-Variable Testing to Improve Promotion Programs", Stores, Dec. 1998, (www stores com), pp. 69-70.

Myhre, James W., "Examiner's Affidavit", dated Feb. 22, 2001.

Website: "World's First Digital Menus", (http://www.epicuredigital. com/pdfs/history.pdf), download date: Jan. 30, 2004.

Website: "Lively Multimedia—It's Missing on Your Menu", (http:// www.epicuredigital.com/pdfs/multimedia.pdf), download date: Jan. 30, 2004.

Website: "If you're Menu Bored—So are Your Customers", (http:// www.epicuredigital.com/pdfs/godigital.pdf), download date: Jan. 30, 2004.

Website: "Specs", (http://www.epicuredigital.com/pdfs/specs.pdf), download date: Jan. 30, 2004.

Office Action for U.S. Appl. No. 10/770,385 mailed May 7, 2009, 6 pp.

Office Action for U.S. Appl. No. 10/770,385 mailed Nov. 14, 2009, 6 pp.
Office Action for U.S. Appl. No. 11/456,300 mailed Mar. 31, 2009, 6 pp.
Office Action for U.S. Appl. No. 11/456,300 mailed Sep. 10, 2008, 4 pp.
Office Action for U.S. Appl. No. 10/403,184 mailed Jan. 22, 2009, 7 pp.
Office Action for U.S. Appl. No. 10/403,184 mailed Sep. 28, 2007, 5 pp.
International Search Report for PCT/US03/009533 mailed Aug. 25, 2004, 3 pp.
International Preliminary Examination Report for PCT/US03/009533 mailed Jun. 16, 2004, 4 pp.

* cited by examiner

| PLU NUMBER 305 | PLU TYPE 310 | ITEM DESCRIPTOR 315 | PRICE A 320 | TIME A 325 | PRICE B 330 | TIME B 335 |
|---|---|---|---|---|---|---|
| PLU001 | SIDE | SMALL FRY | $0.89 | 11:00 AM - 3:00 PM | $0.99 | 4:00 PM - 11:00 PM |
| PLU002 | DRINK | SMALL COLA | $0.99 | 11:00 AM - 3:00 PM | $1.09 | 4:00 PM - 11:00 PM |
| PLU003 | SANDWICH | HAMBURGER | $1.09 | 11:00 AM - 3:00 PM | $1.19 | 4:00 PM - 11:00 PM |
| PLU004 | COMBO | 2 SMALL FRY, 2 DRINKS, 2 HAMBURGERS | $7.00 | 11:00 AM - 3:00 PM | $7.50 | 4:00 PM - 11:00 PM |

| TIME LAG FOR RAISING PRICES 345 | TIME LAG FOR LOWERING PRICES 350 | QUANTITY ASSEMBLED 355 | QUANTITY IN INVENTORY 360 | MAX. ASSEMBLED BEFORE SALE 365 | MAX. INVENTORY BEFORE SALE 370 | SALE PRICE 375 | MAX. ASSEMBLED BEFORE FREE 380 | MAX. INVENTORY BEFORE FREE 385 | ITEM DAY PART(S) 390 |
|---|---|---|---|---|---|---|---|---|---|
| 15 MIN. | 0 | 8 | 80 | 6 | 70 | $0.59 | 7 | 90 | BREAKFAST, LUNCH, DINNER |
| 15 MIN. | 0 | 7 | 70 | 10 | 80 | $1.09 | 15 | 100 | LUNCH, DINNER |
| 15 MIN. | 0 | 6 | 15 | 10 | 20 | $0.99 | 15 | 50 | LUNCH |
| 15 MIN. | 0 | 5 | 5 | 10 | 10 | $0.49 | 15 | 80 | DINNER |

FIG. 3B

| SLOT IDENTIFIER 405 | LOCATION 410 | DESCRIPTION 415 | UPSELL TYPES ALLOWED 420 | DAY PART(S) 425 |
|---|---|---|---|---|
| 1 | DMB | LOWER RIGHT HAND QUADRANT | 004, 003 | LUNCH |
| 2 | CUST. DISPLAY | RIGHT HAND HALF | 005 | BREAKFAST |
| 3 | DMB | LOWER LEFT HAND QUADRANT | 002 | BREAKFAST, LUNCH |
| 4 | CUST. DISPLAY | LEFT THIRD | 001 | DINNER |
| 5 | DMB | UPPER HALF | 003 | LUNCH, DINNER |

FIG. 4

| TYPE IDENTIFIER 505 | DESCRIPTION 510 | USED IN SLOT 515 | CATEGORY 520 |
|---|---|---|---|
| 001 | ORDER CONFIRMATION | 4 | ADVERTISEMENT |
| 002 | SIDE LIST | 3 | ADVERTISEMENT |
| 003 | VALUE MEAL LIST | 5 | ADVERTISEMENT |
| 004 | COLA ADD | 1 | ADVERTISEMENT |
| 005 | SPARE CHANGE ROUND UP | 2 | UPSELL |

| TRANSACTION IDENTIFIER 705 | ORDER CONTENTS 710 | ORDER PRICE 715 | TIME 720 | DATE 725 | CUSTOMER IDENTIFIER 730 |
|---|---|---|---|---|---|
| 12001 | PLU101, PLU002, PLU030 | $4.89 | 1:15:02 PM | 01/26/2003 | 1001 |
| 12002 | PLU101, PLU003, PLU040 | $5.27 | 1:15:03 PM | 01/26/2003 | 1002 |
| 12003 | PLU100 | $1.15 | 1:15:09 PM | 01/26/2003 | 1004 |
| 12004 | PLU099, PLU099, PLU076 | $6.95 | 1:15:32 PM | 01/26/2003 | 1005 |
| 12005 | PLU098, PLU105, PLU007 | $15.27 | 1:15:48 PM | 01/26/2003 | 1003 |

| COMBO IDENTIFIER 805 | COMBO CONTENTS 810 | COMBO POPULARITY RANK 815 |
| --- | --- | --- |
| 1 | PLU101, PLU002, PLU003 | 8 |
| 2 | PLU001, PLU002 | 15 |
| 3 | PLU003, PLU010, PLU099 | 1 |
| 4 | PLU014, PLU091, PLU007 | 6 |
| 5 | PLU032, PLU051, PLU006 | 3 |
| 6 | PLU027, PLU091, PLU003 | 68 |

FIG. 8

DIGITAL ADVERTISEMENT BOARD IN COMMUNICATION WITH POINT-OF-SALE TERMINALS

The present application is a continuation of U.S. patent application Ser. No. 10/770,385, filed Feb. 2, 2004, now abandoned entitled "DIGITAL ADVERTISEMENT BOARDS IN COMMUNICATION WITH POINT-OF-SALE TERMINALS";
 (i) which claims the benefit of U.S. Provisional Patent Application Ser. No. 60/444,250, filed Jan. 31, 2003, entitled "IMPROVED DIGITAL ADVERTISEMENT BOARDS WITH FULL CONNECTIVITY TO POINT-OF-SALE TERMINALS"; and
 (ii) is a continuation-in-part of U.S. patent application Ser. No. 10/403,184, filed Mar. 28, 2003, now abandoned entitled "METHOD AND APPARATUS FOR MANAGING AND PROVIDING OFFERS"; which claims the benefit of U.S. Provisional Patent Application No. 60/369,108, filed Mar. 29, 2002, entitled "OFFER MANAGER SYSTEM."

Each of the above-referenced applications is incorporated by reference herein in its entirety.

CROSS-REFERENCE TO RELATED APPLICATIONS

The present Application is related to each of the following commonly-owned, co-pending U.S. Patent Applications:
 (i) U.S. patent application Ser. No. 09/990,821, filed Nov. 21, 2001, entitled "SYSTEM AND METHOD PROVIDING A RESTAURANT MENU DYNAMICALLY GENERATED BASED ON REVENUE MANAGEMENT INFORMATION";
 (ii) U.S. patent application Ser. No. 09/993,228, filed Nov. 14, 2001, entitled "METHOD AND APPARATUS FOR DYNAMIC RULE AND/OR OFFER GENERATION"; and
 (iii) U.S. patent application Ser. No. 09/603,677, filed Jun. 26, 2000, entitled "METHOD AND APPARATUS FOR SELECTING A SUPPLEMENTAL PRODUCT TO OFFER FOR SALE DURING A TRANSACTION."

The entirety of each of the related Applications above is incorporated by reference herein for all purposes.

BACKGROUND

As is well known, many types of quick service restaurant operators (and other retail operators) use point-of-sale terminals to enter transactions, reconcile inventory, and/or track revenue. Such terminals are typically connected to a back office server (e.g., a restaurant server) that may be configured to generate reports of transactions, labor schedules, and inventory, for example.

As is well known, some types of quick-serve restaurants use electronic or digital menu boards to display the menu offered by the restaurant. In addition to a menu, digital menu boards can also be used to display advertising for the owner/operator of the board and/or for third-party advertisers. Digital menu boards have been proven to increase sales for items displayed on them, but may be difficult to configure and update. For example, when an operator changes the price of a particular food item, or adds a new menu item to a menu, graphics for a digital menu board may have to be redone by a third-party service.

BRIEF DESCRIPTION OF THE FIGURES

FIGS. 3A and 3B are a table illustrating an exemplary data structure of a point-of-sale database consistent with at least one embodiment of the present invention.

FIG. 4 is a table illustrating an exemplary data structure of an advertisement/upsell slot database consistent with at least one embodiment of the present invention.

FIG. 5 is a table illustrating an exemplary data structure of an advertisement/upsell type database consistent with at least one embodiment of the present invention.

FIG. 7 is a table illustrating an exemplary data structure of a transaction database consistent with at least one embodiment of the present invention.

FIG. 8 is a table illustrating an exemplary data structure of a combo popularity database consistent with at least one embodiment of the present invention.

DETAILED DESCRIPTION

Figure 1A:
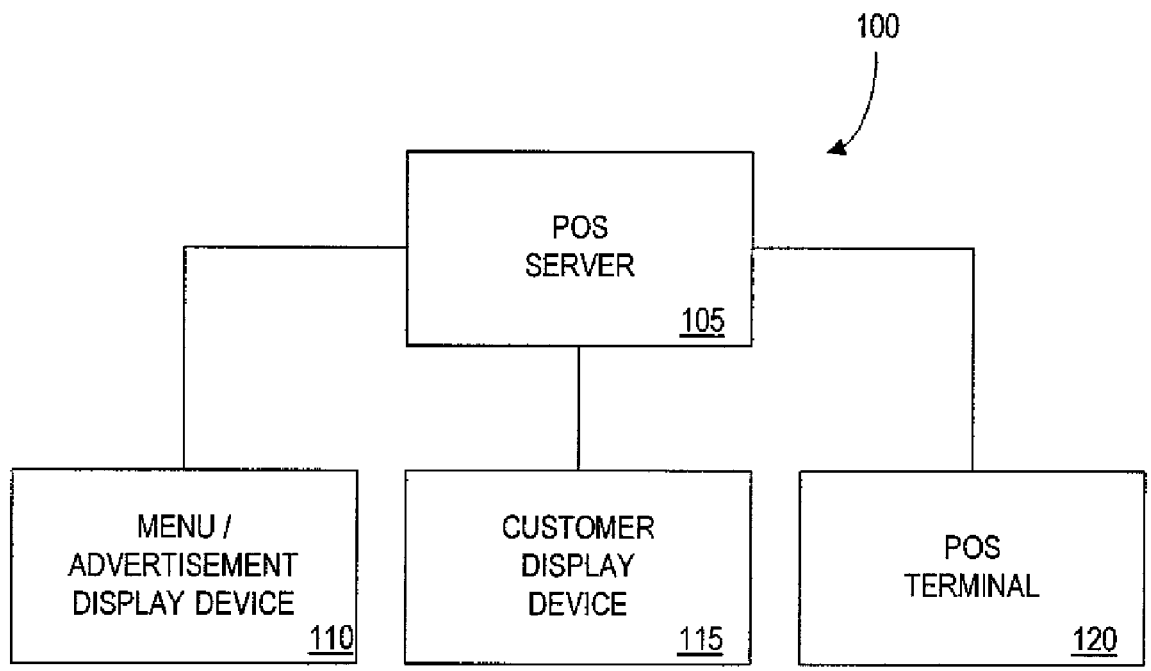
FIG. 1A shows a block diagram of a system that is consistent with at least one embodiment of the present invention.

Various embodiments of the present invention are described herein with reference to the accompanying drawings. The leftmost digit(s) of a reference numeral typically identifies the figure in which the reference numeral first appears.

Applicants have recognized that there are numerous advantages to providing for managing the determination, dissemination, and display of various types of retail information (e.g., prices, inventory, menus, offers) among any number of point-of-sale, order entry, and/or display devices in a retail environment (e.g., a retail store, a quick service restaurant).

Applicants have also recognized that it would be advantageous to provide for a system that allowed for the synchronization of price and item information (i) used at a point-of-sale terminal and (ii) displayed on a digital menu board.

Applicants have recognized that some benefits of managing and providing display content in accordance with various embodiments of the present invention include improved or optimized revenues, gross margin, profits, speed of service, inventory levels, promotions, labor requirements, and/or customer satisfaction.

1. System

Referring now to FIG. 1A, a system 100 according to one or more embodiments of the present invention includes a point-of-sale (POS) server 105 that is in communication with one or more devices, such as one or more menu/advertisement display devices 110, one or more customer display devices 115, and one or more POS terminals 120.

As described in further detail herein, the POS server 105 (which may be an existing server that fulfills various in-store POS or back office server duties) is operable to manage and/or optimize the distribution and display of offer, product, menu, and/or advertising information. For example, the POS sever 105 for a restaurant may manage the dissemination (e.g., to one or more POS terminals 120) and display (e.g., at one or more menu/advertisement display devices 110) of price information for various menu items.

In various embodiments, the POS server 105 (or, in an alternative embodiment, a peer-to-peer network) can control whether a price for an item will be made at a given time, determine what a new price for an item will be, determine where and how new price information will be displayed and/or collect transaction data for future use such as optimization of item offerings and display (or sharing such data among multiple locations).

The POS server 105 may communicate with the devices 110, 115 and 120 directly, via a network such as a Local Area Network (LAN), the Internet or via any other communication technology, as is well known in the art. Each of the devices 110, 115 and 120 may comprise computers, such as those based on the Intel® Pentium® processor, that are adapted to communicate with the POS server 105. Any number of such devices may be in communication with the POS server 105. Further, those of skill in the art will understand that any of the devices 110, 115 and 120 may be omitted, in various embodiments of the present invention.

Communication between the devices 110, 115 and 120 and the POS server 105 may be direct or indirect, such as over the Internet through a Web site maintained by POS server 105 on a remote server, or over an on-line data network including commercial on-line service providers, bulletin board systems and the like. In yet other embodiments, the devices may communicate with POS server 105 over radio frequency (RF) signals, cable television signals, satellite communication links and the like.

Those skilled in the art will understand that devices in communication with each other need not be continually transmitting to each other. On the contrary, such devices need only transmit to each other as necessary, and may actually refrain from exchanging data most of the time. For example, a device in communication with another device via the Internet may not transmit data to the other device for weeks at a time.

The POS server 105 may function as a "Web server" that generates Web pages (documents on the Web that typically include an HTML file and associated graphics and script files) that may be accessed via the Web and allows communication with the POS server 105 in a manner known in the art.

Any or all of the devices 110, 115 and 120 may be, e.g., conventional personal computers, portable types of computers, such as a laptop computer, a palm-top computer, a hand-held computer, or a Personal Digital Assistant (PDA), or they may be specialized devices built for specific purposes such as environmentally-hardened displays for use in a drive through, or POS terminals with separate or integrated customer LCDs or similar displays.

The customer display device 115 may be one or more screens, such as a flat panel monitor or cathode ray tube monitor, that are capable of displaying visual information such as images, text and video. The customer display device 115 may include an audio output means, such as a speaker, which generates sounds (e.g. synthetic speech, recorded voice or other sounds) as directed by the POS server.

The customer display device 115 may include a printer, such as one which prints receipts or coupons, which prints as directed by the POS server. Accordingly, the customer display device 115 can provide offers in displayed, audio and/or printed form.

The customer display device 115 may include a touch screen overlaid on the monitor and capable of receiving manual input from a customer. The customer display device 115 may include other known input devices, such as a microphone for voice input, a keyboard, a stylus, a pen reader, a radio frequency receiver (e.g., for detecting signals from cellular telephones or other transmitting devices) and/or a card reader.

In some embodiments, a customer display device is associated with (e.g., in communication with, driven by, a peripheral of) a point-of-sale terminal. For example, the customer display device may be located in front of a POS terminal and visible and/or accessible by a particular customer (e.g., for using a touch screen) during a transaction at the POS terminal. In some embodiments, a customer display device is associated with (e.g., in communication with, driven by, a peripheral of) a customer self-ordering station or kiosk.

The menu/advertisement display device 110 may include a digital menu board or other type of electronic display device which is operable to display to customers, among other things, product names and corresponding prices and/or advertisements or promotions for various types of goods and services. Exemplary menu/advertisement display devices include those manufactured by Epicure Digital™.

The menu/advertisement display device 110 may comprise one or more types of display devices such as, without limitation, plasma screens, televisions, projection systems (e.g., LCD projection screen), LCD screens, cathode ray monitors, and various combinations thereof, that are capable of displaying visual information such as images, text and video.

The menu/advertisement display device may also include an audio output means, such as a speaker, which generates sounds (e.g. synthetic speech, recorded voice or other sounds) as directed by the POS server.

In some embodiments, a customer display device is associated with (e.g., in communication with, driven by, a peripheral of) a customer self-ordering station or kiosk. In some exemplary embodiments, a menu/advertisement display device 110 is located at a retailer's drive through and/or behind the service counter (e.g., for use by customers in making menu selections).

The POS terminal 120 may be, for example, the IBM 4683 or IBM 4693 manufactured by International Business Machines. As is known in the art, point-of-sale terminals typically include a display capable of displaying, e.g., text messages intended to be read by a cashier operating the terminal.

The system 100 depicted in FIG. 1A is presented by way of example only, and would be typical of an apparatus for use in a retail environment such as a quick-service restaurant or grocery store. However, the present invention is not limited to such components and may be used in other environments.

For example, the POS server 105 may be a "Web server" of a merchant (e.g., a retail seller) which communicates with one or more computers (or PDAs, cell phones, or similar devices) via Web browser software or similar programs. The POS server 105 may be operable to generate and/or serve Web pages (documents on the World Wide Web that typically include a Hypertext Markup Language file and associated graphics and script files) that may be accessed via the World Wide Web and allow purchases from the merchant to be made in a manner well known in the art. A Web site typically consists of several such Web pages and associated databases served by one or more HTTP (Hypertext Transfer Protocol) servers (e.g. the POS server 105) on the World Wide Web.

Similarly, the POS server 105 may be in communication with customers via telephones and an Interactive Voice Response Unit. Thus, a customer may hear audio output from the POS server 105 via a telephone (e.g., while on hold with the merchant or a different merchant), and communicate with the POS server 105 via voice or by pressing buttons on the telephone.

The POS server 105 may be a computer involved in operating a physical store. Such a computer, for example, could perform such tasks as inventory management and transaction processing for the store.

The system 100 may alternatively be configured in a multi-tier architecture, as would be apparent to those of skill in the art. The system 100 may also be configured in a peer-to-peer architecture, as would be apparent to those of skill in the art.

The customer display device 115 may be a personal computer or other device which allows a customer to receive offers and provide responses to offers. The customer display device 115 could also be, e.g., a vending machine, a slot machine or any other device which interacts with customer.

Similarly, the menu/advertisement display device 110 could also be a personal computer or other device which allows a customer to view price information and/or advertisements. The menu/advertisement display device 110 could also be, e.g., an electronic display of a vending machine, a slot machine, or any other device useful for providing production information and/or advertising to customers.

Figure 1B:
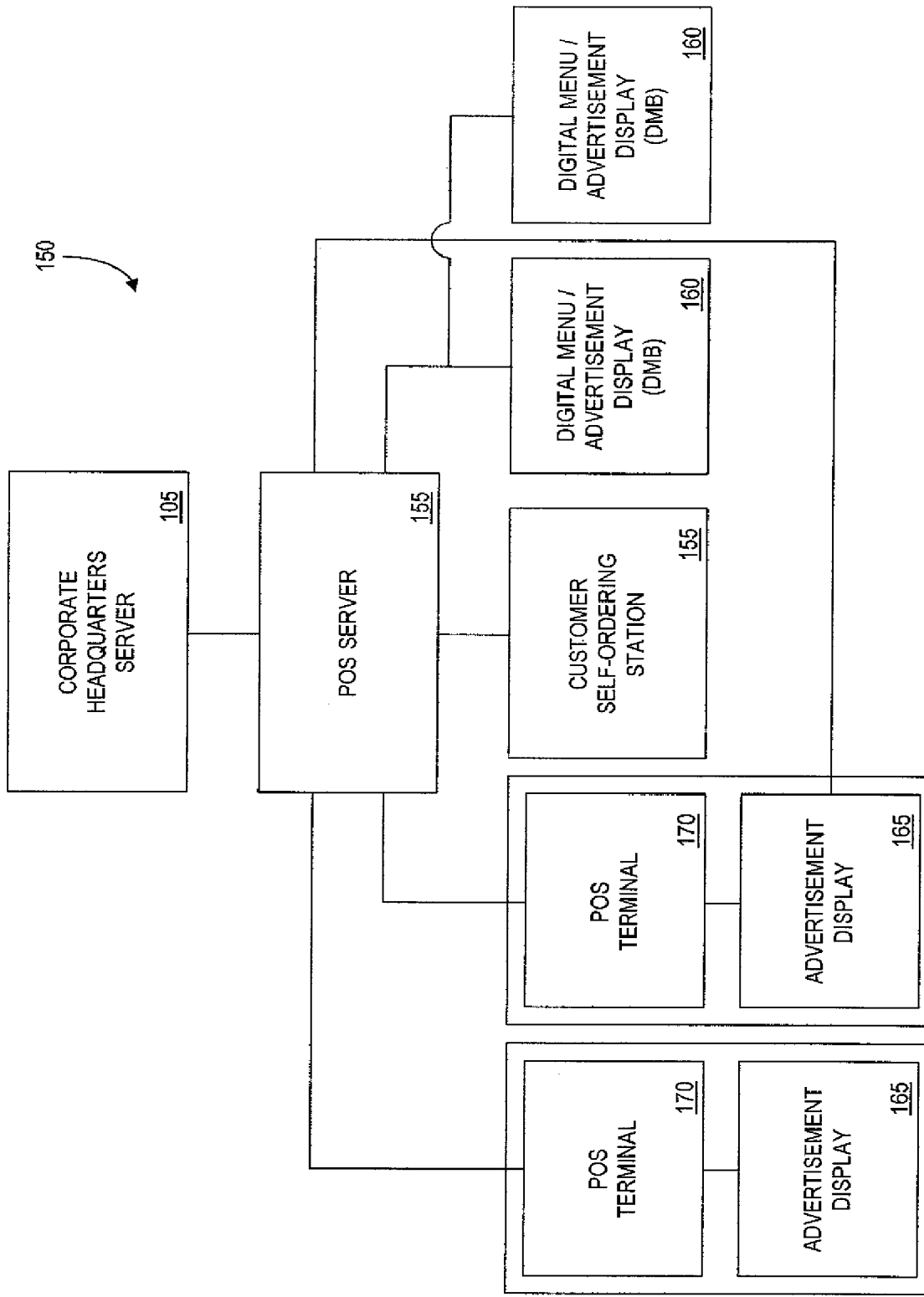
FIG. 1B shows a block diagram of an alternative system that is consistent with at least one embodiment of the present invention.

Referring now to FIG. 1B, an exemplary system 150 according to one or more embodiments of the present invention includes a POS server 155 that is in communication with one or more devices, such as one or more digital menu boards 160, one or more customer advertisement displays 165, one or more POS terminals 170, one or more customer self-ordering stations 175, and one or more corporate headquarters servers 180.

As described in further detail herein, the POS server 155 (which may be an existing server that fulfills various in-store POS or back office server duties) is operable to manage and/or optimize the distribution and display of offer, product, menu, and/or advertising information. For example, the POS sever 155 for a restaurant may manage the dissemination (e.g., to one or more self-ordering stations 170) and display (e.g., at one or more digital menu boards 160, customer advertisement displays 165, and self-ordering stations 175) of price information for various menu items.

POS server 155 is also operable to be controlled by and/or communicate information with corporate headquarters server 180. For example, POS server 155 may report transaction history and other types of store information to the headquarter server. In some embodiments, display content, price information, and/or product information may be transmitted from the headquarters server 180. In some embodiments, various functions described herein as being performed by the POS server 155 may be performed by the corporate headquarter server 180.

The POS server 155 may communicate with the depicted devices directly, via a network such as a Local Area Network (LAN), the Internet or via any other communication technology, as is well known in the art. Each of the devices 160, 165, 170, 175, and 180 may comprise computers, such as those based on the Intel® Pentium® processor, that are adapted to communicate with the POS server 155. Any number of such devices may be in communication with the POS server 155. Further, those of skill in the art will understand that any of the devices 160, 165, 170, 175, and 180 may be omitted, in various embodiments of the present invention.

System 150 differs from that depicted in FIG. 1A in various aspects. Customer advertisement displays 165 are examples of the customer display devices 115 of FIG. 1A. As depicted in system 150, each customer advertisement display 165 is in communication with a respective POS terminal 170. A customer advertisement display 165 may be controlled by the POS terminal 170, in accordance with various embodiments of the present invention, for determining what types of offers and/or advertisements to display to a customer at that POS terminal. Alternatively, or in addition (as represented in FIG. 1B), a customer advertisement display 165 may be in communication with and/or controlled by the POS server 155.

Customer self-ordering station 175 is another example of customer display devices 115 of FIG. 1A, and may also be an embodiment of a menu/advertisement display device 110. For example, the POS server 155 may update a displayed menu at a customer self-ordering station (as for a digital menu board 160), and/or may display an upsell offer that can be interactively accepted by a customer.

Digital menu boards 160 are examples of menu/advertisement display device 110 of FIG. 1A. As discussed above, digital menu board 160 is operable to display to customers, product names and corresponding prices and/or advertisements or promotions for various types of goods and services. In some exemplary embodiments, a digital menu board is located at a retailer's drive through and/or behind the service counter (e.g., for use by customers in making menu selections).

The system 150 depicted in FIG. 1B is presented by way of example only, and would be typical of an apparatus for use in a retail environment such as a quick-service restaurant or grocery store. However, the present invention is not limited to such components and may be used in other environments.

Figure 2:
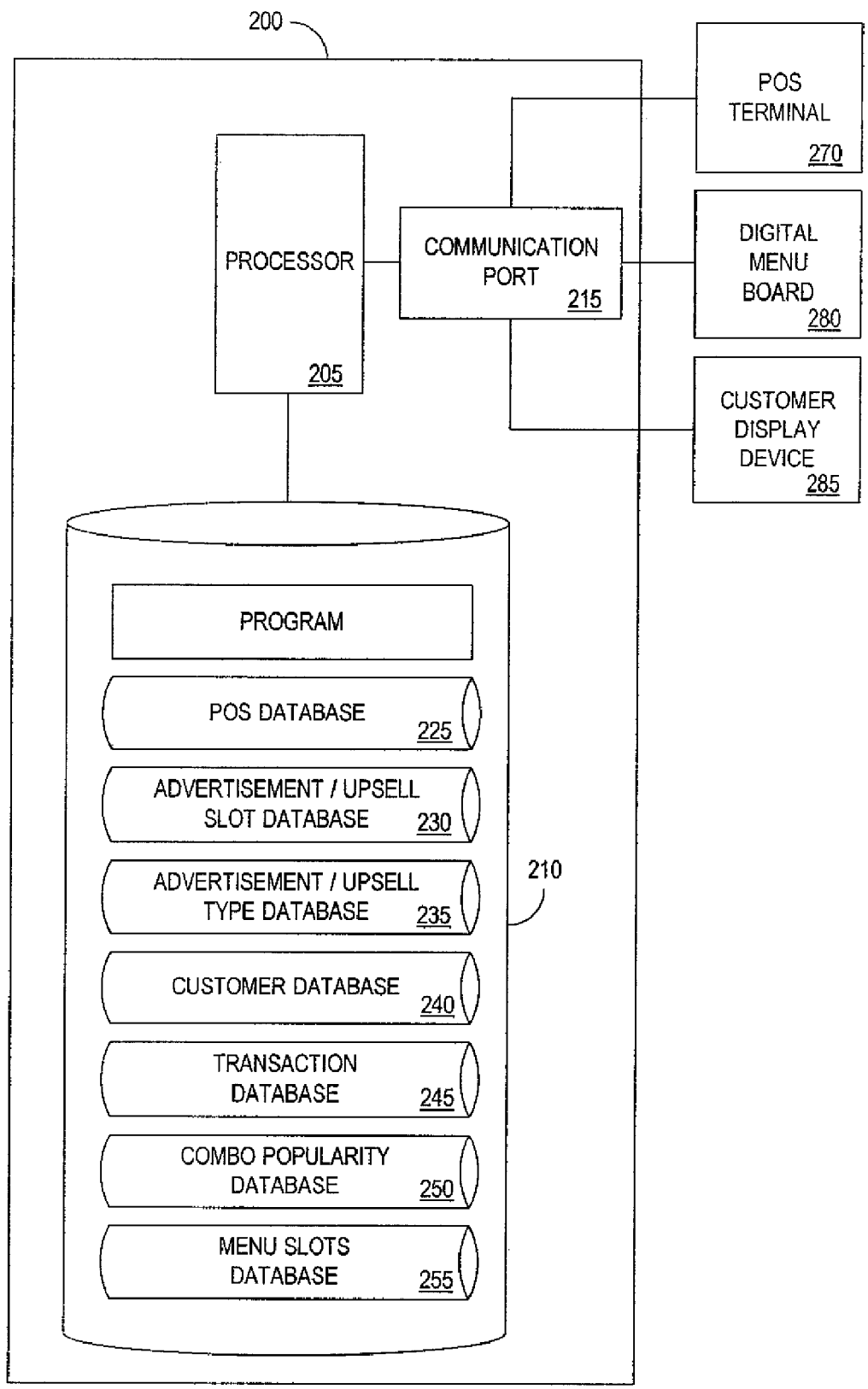
FIG. 2 shows a block diagram of a server that is consistent with at least one embodiment of the present invention.

FIG. 2 illustrates an embodiment 200 of the POS server 105 of FIG. 1A. The POS server may be implemented as a system controller, a dedicated hardware circuit, an appropriately programmed general purpose computer such as an Intel-based PC, a server computer such as a Sun Fire B100s Blade Server manufactured by Sun Microsystems Inc. or a "Precision Workstation" or "Poweredge 350" manufactured by Dell Computer Corporation, or any other equivalent electronic, mechanical or electro-mechanical device suited for the volume of transactions and the performance levels desired.

The POS server 200 comprises a processor 205, such as one or more Intel® Pentium® processors. The processor 205 is coupled to a communication port 215 through which the processor 205 communicates with other devices.

The processor 205 is also in communication with a data storage device 210. The data storage device 210 comprises an appropriate combination of magnetic, optical and/or semiconductor memory, and may include, for example, Random Access Memory (RAM), Read-Only Memory (ROM), a compact disc and/or a hard disk. The processor 205 and the storage device 210 may each be, for example: (i) located entirely within a single computer or other computing device; or (ii) connected to each other by a remote communication medium, such as a serial port cable, telephone line or radio frequency transceiver. In one embodiment, the POS server may comprise one or more computers that are connected to a remote server computer for maintaining databases.

The data storage device 210 stores a program 225 for controlling the processor 205. The processor 205 performs instructions of the program 225, and thereby operates in accordance with the present invention, and particularly in accordance with the methods described in detail herein. The program 225 may be stored in a compressed, uncompiled and/or encrypted format. The program 225 furthermore includes program elements that may be necessary, such as an operating system, a database management system and "device drivers" for allowing the processor 205 to interface with computer peripheral devices. Appropriate program elements are known to those skilled in the art, and need not be described in detail herein.

According to an embodiment of the present invention, the instructions of the program 225 may be read into a main memory from another computer-readable medium, such as from a ROM to a RAM. Execution of sequences of the instructions in program 225 causes processor 205 to perform the process steps described herein. In alternative embodiments, hard-wired circuitry may be used in place of, or in combination with, software instructions for implementation of the processes of the present invention. Thus, embodiments of the present invention are not limited to any specific combination of hardware and software.

The storage device 210 also stores (i) a POS database 230, (ii) an advertisement/upsell slot database 235, (iii) an advertisement/upsell type database 240, (iv) a customer database 245, (v) a transaction database 250, (vi) a combo popularity database 255, and (vii) a menu slots database 260. The databases are described in detail below and depicted with exemplary entries in the accompanying figures.

As will be understood by those skilled in the art, the schematic illustrations and accompanying descriptions of the databases presented herein are exemplary arrangements for stored representations of information. A number of other arrangements may be employed besides those suggested by the tables shown. Similarly, the illustrated entries of the databases represent exemplary information only; those skilled in the art will understand that the number and content of the entries can be different from those illustrated herein. Further, despite the depiction of the databases as tables, an object-based model could be used to store and manipulate the data types of the present invention and likewise, object methods or behaviors can be used to implement the processes of the present invention.

Note that, although these databases are described as being stored in a POS server, in other embodiments of the present invention some or all of these databases may be partially or wholly stored in another device, such as one or more of the POS terminals, menu/advertisement display devices, self-ordering stations, corporate headquarters servers, or customer display devices, or a combination thereof.

Various functionality of the POS server described herein may alternatively be performed by the menu/advertising device 110, the customer display device 115, the POS terminal 120, and/or a remote server or system (e.g., corporate headquarters server 180). For example, an appropriately programmed point-of-sale terminal or digital menu board system may perform various functions described herein as being performed by the POS server.

In some embodiments, the POS server operates in accordance with one or more databases of rules. Various embodiments of the present invention may be implemented by merely defining and selecting appropriate rules to govern the functionality of the POS server, as will be apparent to those of skill in the art. Such rules can specify, e.g., how to identify when to make pricing updates, the amount by which to adjust a price, how to determine whether to provide an offer/advertisement and/or where to display the offer/advertisement, and/or how to create or select items to make available for sale (and/or how to remove items).

A rule-based system appropriate for use in accordance with the present invention is disclosed in pending U.S. patent application Ser. No. 09/603,677, filed Jun. 26, 2000, entitled "METHOD AND APPARATUS FOR SELECTING A SUPPLEMENTAL PRODUCT TO OFFER FOR SALE DURING A TRANSACTION," the entirety of which is incorporated herein by reference as part of the present disclosure.

A rule may specify how to select a presentation slot of a digital menu board to display a menu item, e.g., by identifying one or more presentation slots based on the type of item, type of display content, and/or time of day.

A rule may specify how to determine whether to provide an offer/advertisement during a transaction and/or during a transaction slot, e.g., by specifying which offers or types of offers may be provided during the transaction slot and/or a maximum number of offers or types of offers which may be provided. A system appropriate for use in accordance with the present invention for determining transaction slots, whether to provide an offer to a customer, and/or what type of offer to provide, is disclosed in U.S. patent application Ser. No. 10/403,184, filed Mar. 28, 2003, entitled "METHOD AND APPARATUS FOR MANAGING AND PROVIDING OFFERS."

A rule may specify how to add, remove, or modify an item for sale, e.g., by specifying performance data such as the expected revenue, profitability and/or transaction volume for the item, expected increase in net profit per second, and/or specifying how performance data is to be weighed in evaluating updates to product information (e.g., information about price and/or availability).

Similarly, a rule may specify features of an offer, such as an amount of a discount on an offered product, or the relationship between the amount of a discount and the transaction total, customer identity, type of customer, etc. For example, a rule may specify that a more enticing offer (e.g., one with a greater perceived or actual value) is to be provided to a customer who has not accepted an offer earlier in the same transaction or in previous transactions. Similarly, a rule may specify that an offer with a higher average acceptance rate is to be provided to a customer who has not accepted an offer earlier in the same transaction or in previous transactions.

A rule may specify how to provide an offer to a customer, e.g., by specifying whether the offer should be provided via display or speaker and/or specifying which portion of the display the offer should occupy. The POS server may also test a variety of offer locations (e.g., customer display device, digital menu board, self-ordering kiosk), types, sizes, and audio/video types, lengths, voice types, etc., in order to determine which are most effective, individually or collectively.

Further, any of the above-described types of rules may deliberately specify random behavior to both prevent exploitation by customers and to attempt to learn new information, which can be used for subsequent optimization. For example, an advertisement, upsell offer, or menu item may be randomly selected and be provided during a random transaction slot.

As is known in the art, a rules-based system may be modified by an adaptive system in order to increase the performance of the rules-based system. An adaptive system which, among other things, may create its own rules and/or modifies rules in accordance with desired performance, and which is appropriate for use in accordance with the present invention is disclosed in pending U.S. patent application Ser. No. 09/993,228, filed Nov. 14, 2001, entitled "METHOD AND APPARATUS FOR DYNAMIC RULE AND/OR OFFER GENERATION," the entirety of which is incorporated herein by reference as part of the present disclosure. That application discloses an apparatus and method that permit and enable rules-based applications (such as a system that provides customers with dynamically-priced upsell offers) to become "self improving" and thus increase performance over time.

Such an adaptive system can adjust at least some of the rules in accordance with at least one "reward," which is a measure of performance. For example, an adaptive system can modify rules such that offered items that have previously proven popular when provided after a particular rejected offer are, in subsequent transactions, provided after such rejected offers.

Similarly, the number of items, the types of items and/or advertisements, and/or display configuration of one or more menu/advertisement boards, for example, could be adjusted by an adaptive system to increase performance as measured by, e.g. transaction time, offer acceptance rates, item selection, profitability, etc.

Furthermore, an offer or assembled combo item might include a discount or deeper discount to increase the likelihood of acceptance. Finally, the system might cease making active offers altogether during a given transaction if it is determined that the customer is unlikely to accept such additional offers.

As is known in the art, various types of revenue management information may be used to determine (e.g., dynamically) price information and/or which items to make available for sale. A system which, among other things, is capable of making dynamic determinations about menu creation and pricing based on revenue management information, and which is appropriate for use in accordance with the present invention is disclosed in pending U.S. patent application Ser. No. 09/990,821, filed Nov. 21, 2001, entitled "SYSTEM AND METHOD PROVIDING A RESTAURANT MENU DYNAMICALLY GENERATED BASED ON REVENUE MANAGEMENT INFORMATION."

A typical restaurant menu, for example, does not take advantage of current revenue management information. Some embodiments of the present invention allow, for example, for determining pricing based on the current supply and demand of various items. For example, an item may currently be more popular, that is, in higher "demand," than predicted, and therefore the item's price on a displayed menu (e.g., a static or electronic menu board) will be too low. Likewise, an item may turn out to be less popular and have a price that is too high. In either case, the restaurant may not be making as much profit as it could.

Revenue management information may comprise, for example, information related to the current demand for, or previous sales of, an item or category of items. For example, the revenue management information could reflect the number of items that have been sold over a given period of time (e.g., a transaction volume for that item). Thus, if a chicken sandwich is being sold at an unusually quick pace, the price of the sandwich on the menu may be slightly increased.

The revenue management information may also comprise, for example, information related to the current supply, or inventory, of the item. For example, the revenue management information could reflect the number of items that are currently in a kitchen's pantry. According to another embodiment of the present invention, the inventory may also reflect a predicted amount of inventory, an age of inventory or a price paid for inventory. For example, if a supply of steaks is nearing the end of its useful life, or if the steaks had been purchased at an unusually inexpensive price, the revenue management information may be used to decrease the price of related items on the menu.

The revenue management information may simply reflect the current supply and demand, or may instead take "historical" information into account, such as previous information related to particular days, time-of-days, day-of-weeks or month-of-years. For example, if sales of steak traditionally peak during Friday evenings in the winter, prices on the menu could be automatically and dynamically adjusted accordingly.

In addition to dynamically adjusting prices on a menu, a restaurant, for example, may dynamically adjust which items are included on a menu. For example, when a restaurant temporarily runs out of a particular item, customers may still attempt to order the item only to be told that the item is not available. This may frustrate customers and complicate the order taking process. Based on revenue management information, a display of the items available may be updated dynamically as conditions change.

The following are several examples which illustrate various embodiments of the present invention. These examples do not constitute a definition of all possible embodiments, and those skilled in the art will understand that the present invention is applicable to many other embodiments. Further, although the following examples are briefly described for clarity, those skilled in the art will understand how to make any changes, if necessary, to the above-described apparatus and methods to accommodate these and other embodiments and applications.

One or more embodiments of the present invention allow for an adaptive and/or rules-based system to determine the best information to display on a menu/advertisement display device, such as a digital menu board.

Some embodiments allow for the POS server 105 (or some other central server) to determine, based on transaction history, revenue management information, transaction volume, and/or other types of retail information, one or more of the following:

(i) what items to make available for purchase,
(ii) what combinations of items to make available (e.g., a combo meal item),
(iii) what images or other content of items (e.g., video/audio advertisements, text descriptions) to display at one or more types of display devices,
(iv) the size of displayed content (e.g., font size, image size),
(v) where descriptions and/or images are placed (e.g., a menu board layout),
(vi) pricing of one or more items, and
(vii) when to make determinations such as (i)-(vi) above.

For example, a restaurant has images of forty combo meals and fifty sides (e.g., stored in a POS database or display content database). The restaurant's digital menu board, however, only has slots for information about eight combo meals and seven sides. The system queries the order history (e.g., as stored in a transaction database). Based on what is being ordered at the restaurant, the system determines which combo meals to offer. Also, the system is able to determine the location, number, and size of the displayed available items.

The system may determine (e.g., based on one or more stored rules) that it is better for the restaurant to display eight sides on the digital menu board, using smaller images, than to display only six larger images of sides.

One or more embodiments of the present invention provide for a menu/advertisement display device and/or a customer display device operable to (i) receive price and/or content information (e.g., from a restaurant server, from a point-of-sale terminal), update any stored price and/or content information as necessary in accordance with the received information, and output an indication of some or all of the updated information. For example, the display of a digital menu board may be updated to reflect a change in the price of a menu item based on information received from a restaurant server.

Various embodiments of the present invention provide for managing the determination and dissemination of various types of retail information (e.g., prices, inventory, menus, offers) among any number of point-of-sale, order entry, and/or display devices in a retail environment (e.g., a retail store, a quick service restaurant).

A synchronization process consistent with at least one embodiment of the present invention allows for a retail establishment such as a restaurant to ensure that price information and other content displayed at a menu/advertisement display device is consistent with information used by the establishment, for example, in promoting/offering products and conducting transactions.

Some embodiments of the present invention allow for synchronization of information among one or more point-of-sale terminals and one or more digital menu boards. According to some embodiments, a process for synchronizing price and content in a restaurant may be performed by a restaurant server and/or a point-of-sale terminal in synchronizing information displayed at a digital menu board and used in a POS system. Although various embodiments described herein may relate to price information in particular, it will be understood that the updated information may comprise any of various types of retail information (e.g., inventory, advertisement).

One or more embodiments of the present invention provide a system and method for updating price information at a point-of-sale terminal and at a digital menu board at substantially the same time, or in accordance with a time lag.

At least one embodiment of the present invention provides for a digital menu/advertisement display device (e.g., digital menu board) in communication with one or more components of a point-of-sale system (e.g., a point-of-sale terminal, a point-of-sale server).

According to some embodiments of the present invention, dynamic pricing changes and changes to item availability (e.g., based on revenue management information) may be propagated across one or more point-of-sale devices (e.g., POS terminals) and one or more menu/advertisement display devices (e.g., a digital menu board).

According to some embodiments of the present invention, a combined point-of-sale and digital menu board system allows descriptions, images, and/or prices of menu items available to point-of-sale devices (e.g., a point-of-sale terminal) and/or customer order devices (e.g., self-ordering kiosk) to be linked to, or synchronized with, the description, images, and/or prices of menu items displayed at one or more digital menu boards.

Some embodiments of the present invention allow for at least one point-of-sale terminal and at least one digital menu board to receive or otherwise have access to the same pricing or other retail information. In some embodiments, a point-of-sale terminal and a digital menu board access the same information from a central server. In some embodiments, information is determined at one device (e.g., a central in-store server) and transmitted to a point-of-sale system (e.g., a point-of-sale server, a point-of-sale terminal) and to a display system (e.g., a display device, a controller for one or more display devices). In one or more embodiments, a central server determines pricing information and communicates the pricing information to at least one point-of-sale terminal (e.g., for use in accepting customer orders). The central server also communicates the pricing information to a digital menu board, display server, or other device operable to update the digital menu board to represent the determined pricing information (e.g., in a displayed menu).

According to some embodiments of the present invention, one or more menu items in one or more menu categories may be added, removed, or modified from a display at a digital menu board in accordance with information stored in a point-of-sale system (e.g., available to a point-of-sale terminal). In this way, the display at a digital menu board can be kept up to date with the current items and pricing available to a customer at the point of sale. Of course, although it might be preferred, it will be understood that not all of the items and offers currently available to a customer need be displayed at a digital menu board. Nonetheless, some systems and methods of the present invention may be useful to ensure (i) that any menu items and advertisements displayed are currently available in the point-of-sale system, and (ii) that any pricing information displayed is up to date.

At least one embodiment of the present invention includes a system and method for determining a category of items to display at a menu/advertisement board. Some embodiments provide for determining one or more items and/or categories of items to display within a predefined display area of a display device.

For example, a digital menu board may have one or more defined display portions for displaying different types of information (e.g., regular menu items and advertisements). Menu items to display in one of the display portions may be determined by the system (e.g., based on transaction history). The determination may take into account, without limitation, the size of the display portion, the number of items desired to be displayed, and/or a desirable font and/or image size for displayed information. Other factors useful in determining the layout of one or more display portions of a menu/advertisement board may be recognized by those of skill in the art upon reading the present disclosure.

Some embodiments of the present invention provide for the descriptor and price fields of menu items stored in a POS system (e.g., at a server and/or terminal) to be linked to the descriptor and price fields for a digital menu board. The descriptor fields of a particular item may be text, audio, and/or image files. Linking may be advantageous by making the maintenance and upgrades of the digital menu board easier for restaurant managers and other types of owners or operators of digital menu boards. The linking of corresponding fields also allows for synchronization of price information and other types of content between the POS system and the digital menu board(s).

Some embodiments of the present invention provide for a server in communication with one or more POS terminals and one or more menu/advertisement boards. For example, the descriptor and price fields utilized by a digital menu board may be the same as or may be linked to the descriptor and price fields of menu items stored in a POS server.

Various embodiments of the present invention integrate or otherwise combine features of point-of-sale and digital menu board systems. According to some embodiments, a combined point-of-sale/digital menu board system may be configured to add and remove menu items of a digital menu board in one or more menu categories (e.g., sandwiches, sides, drinks) based on the information stored in a point-of-sale system. For example, at least one embodiment ensures that content (e.g., an advertisement) for display on a digital menu board is up to date with information stored in a POS terminal.

Various embodiments of the present invention allow for the updating of one or more displays in a restaurant to reflect the dynamic pricing of one or more menu items. For example, pricing may be updated based on revenue management information. Accordingly, the display at one or more digital menu boards may be updated to reflect the dynamic pricing change.

According to some embodiments, a combination point-of-sale and digital menu board system could have content (e.g., available menu, promotions, third party advertisements) automatically updated based on the time of day and/or day of week. Accordingly, any displayed information (whether displayed at the point-of-sale to a customer or operator or at a digital menu board) and information used in conducting transactions (e.g., as accessed in conducting a transaction) would be consistent.

2. Databases 2.1. POS Database

FIG. 3 is a tabular representation 300 of the POS database 230. The tabular representation of the POS database includes a number of example records or entries, each defining a product sold by a retail establishment. Those skilled in the art will understand that the POS database may include any number of entries.

The tabular representation 300 of the POS database also defines fields for each of the entries or records. The fields specify: (i) a product look-up number (PLU#) 305 that uniquely identifies the corresponding product, (ii) a PLU type 310 that indicates the type of product, (iii) an item descriptor 315 that includes a (preferably text) description of the item, (iv) a price A 325 that indicates a price of the product during time A, (v) a time A 330 that includes an indication of time A during which price A 325 is in effect, (vi) a price B 335 that indicates a price of the product during time B, (vii) a time B 340 that includes an indication of time B during which price B 335 is in effect, (viii) a time lag for raising price 345, (ix) a time lag for lowering price 350, (x) a quantity assembled 355 that indicates a number of the product that are currently assembled, (xi) a quantity in inventory 360 that indicates a number of the product that are in inventory, (xii) a maximum assembled before sale 365 that indicates the maximum number of that product to have assembled before the price is changed to the sale price 375, (xiii) a maximum inventory before sale 370 that indicates the maximum number of that product to have in inventory before the price is changed to the sale price 375, (xiv) a sale price 375, (xv) a maximum assembled before free 380 that indicates the maximum number of that product to have assembled before the product is offered for free, (xvi) a maximum inventory before free 385 that indicates the maximum number of that product to have in inventory before the product is offered for free, and (xvii) an item day part(s) 390 that indicates the part(s) of the day that the product is for sale.

In some embodiments, the POS database also includes fields indicating display content associated with the corresponding item. For example, a specific record may include an image field that stores an image of the item for use in displaying the item on a digital menu board. Alternatively, associated display content may be maintained in one or more separate databases, as will be understood by those skilled in the art.

2.2. Advertisement/Upsell Slot Database

FIG. 4 is a tabular representation 400 of the advertisement/upsell slot database 235. The tabular representation of the advertisement/upsell slot database includes a number of example records or entries, each defining a presentation slot for displaying content such as promotions and upsell offers to one or more customers. Those skilled in the art will understand that the advertisement/upsell slot database may include any number of entries.

The tabular representation 400 of the advertisement/upsell slot database also defines fields for each of the entries or records. The fields specify: (i) a slot identifier 405 that uniquely identifies the corresponding presentation slot, (ii) a location 410 that indicates a location, specific display device, and/or type of display device (e.g., customer display device, digital menu board ("digital menu board")) where the corresponding slot is located, (iii) a description 415 that includes a (preferably text) description of the slot, (iv) an upsell types allowed 420 that contains an indication of the type(s) of upsells allowed at the corresponding slot, and (v) a day part(s) 425 that indicates the part(s) of the day that the slot is available for use.

2.3. Advertisement/Upsell Type Database

FIG. 5 is a tabular representation 500 of the advertisement/upsell type database 240. The tabular representation of the advertisement/upsell type database includes a number of example records or entries, each defining a type of upsell offer or advertisement that may be displayed to one or more customers. Those skilled in the art will understand that the advertisement/upsell type database may include any number of entries.

The tabular representation 500 of the advertisement/upsell type database also defines fields for each of the entries or records. The fields specify: (i) a type identifier 505 that uniquely identifies the type of offer display, (ii) a description 510 that includes a (preferably text) description of the corresponding offer's display content, (iii) a used in slot 515 that contains an indication of the presentation slot(s) used to display the corresponding type of offer, and (iv) a category 520 that indicates the type or class of offer (e.g., upsell offer, advertisement).

2.4. Customer Database

Figure 6:
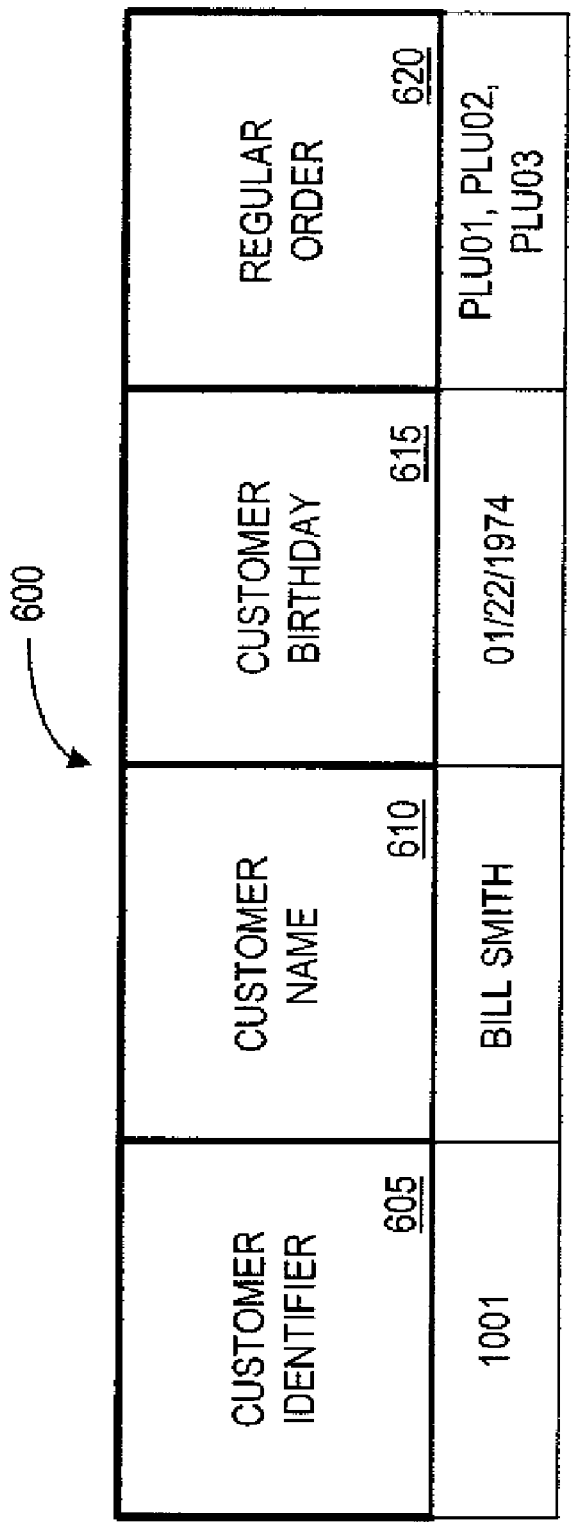
FIG. 6 is a table illustrating an exemplary data structure of a customer database consistent with at least one embodiment of the present invention.

FIG. 6 is a tabular representation 600 of the customer database 245. The tabular representation of the customer database includes a number of example records or entries, each defining information about a particular customer. Those skilled in the art will understand that the customer database may include any number of entries.

The tabular representation 600 of the customer database also defines fields for each of the entries or records. The fields specify: (i) a customer identifier 605 that uniquely identifies a customer, (ii) a customer name 610, (iii) a customer birthday 615, and (iv) a regular order 620 that indicates the PLU numbers corresponding to one or more items regularly ordered by the corresponding customer.

In some embodiments, the customer may indicate his regular order (e.g., to a cashier) for entry into the customer database. In some embodiments, the customer's regular order 620 is determined based on transaction history.

2.5. Transaction Database

FIG. 7 is a tabular representation 700 of the transaction database 250. The tabular representation of the transaction database includes a number of example records or entries, each defining information about a particular transaction. Those skilled in the art will understand that the transaction database may include any number of entries.

The tabular representation 700 of the transaction database also defines fields for each of the entries or records. The fields specify: (i) a transaction identifier 705 that uniquely identifies the transaction, (ii) an order contents 710 that includes an indication of one or more items purchased in the corresponding transaction (e.g., indicated by PLU number), (iii) an order price 715 that indicates a price for the transaction (e.g., a total price charged the customer), (iv) a time 720 that indicates a time of the transaction (e.g., start time, end time), (v) a date 725 that indicates a date of the transaction, and (vi) a customer identifier 730 that identifies a customer associated with the transaction (e.g., the customer making the purchase).

According to some embodiments, using the customer identifier 730 to identify transactions conducted by a particular customer, a customer's transaction history may be analyzed (e.g., in order to determine a regular order).

Of course, it will be readily understood that the time 720 and date 725 may alternatively be represented using a single field including information identifying both the date and time of the transaction.

2.6. Combo Popularity Database

FIG. 8 is a tabular representation 800 of the combo popularity database 255. The tabular representation of the combo popularity database includes a number of example records or entries, each defining information about a defined item (a "combo" item) that is a combination of two or more component items (e.g., a combo meal item). Those skilled in the art will understand that the combo popularity database may include any number of entries.

The tabular representation 800 of the combo popularity database also defines fields for each of the entries or records. The fields specify: (i) a combo identifier 805 that uniquely identifies a combination of two or more items, (ii) a combo contents 810 that includes an indication of two or more items that comprise the corresponding combo item, and (iii) a combo popularity rank 815 that indicates a relative ranking of the popularity of the corresponding combo item.

According to some embodiments, the transaction database may be analyzed to identify orders including two or more items. A combo popularity rank 815 may then be determined for each unique combination of items based on, for example, the number of times a combination is ordered within a given time period.

2.7. Menu Slots Database

Figure 9:
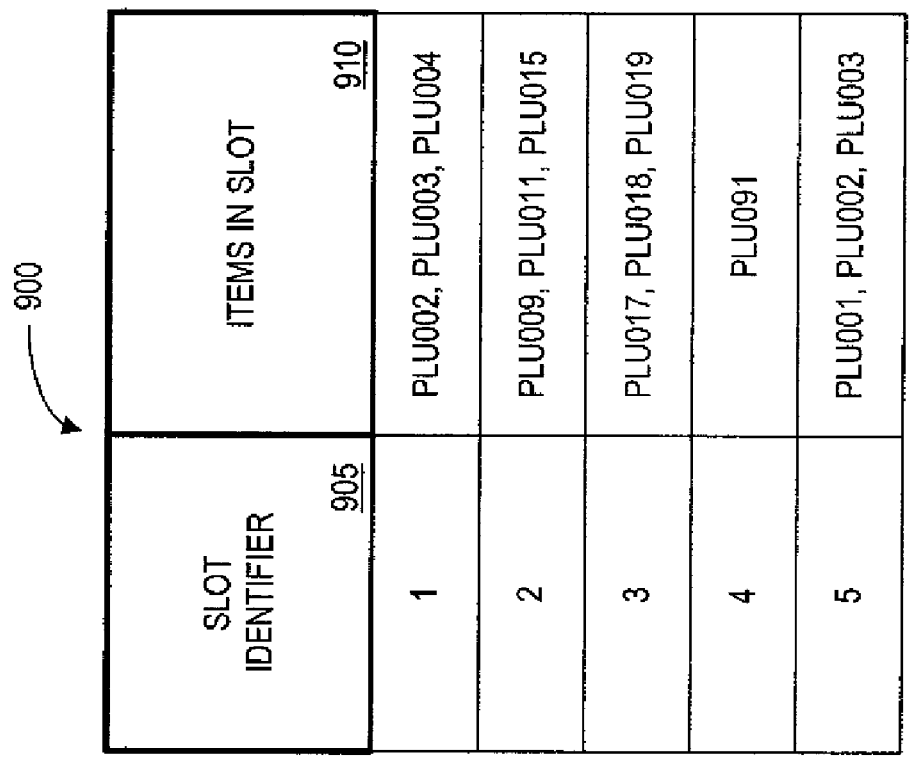
FIG. 9 is a table illustrating an exemplary data structure of a menu slots database consistent with at least one embodiment of the present invention.

FIG. 9 is a tabular representation 900 of the menu slots database 260. The tabular representation of the menu slots database includes a number of example records or entries, each defining information about a particular presentation slot of a digital menu board or other menu/advertisement display device. Those skilled in the art will understand that the menu slots database may include any number of entries.

The tabular representation 900 of the menu slots database also defines fields for each of the entries or records. The fields specify: (i) a slot identifier 905 that uniquely identifies a presentation slot or display portion of a display device, and (ii) an item(s) in slot 910 that includes an indication that information about one or more items (e.g., price and/or product information) is displayed in the corresponding presentation slot.

Those skilled in the art will readily understand that a menu slots database may include information about any number of presentation slots defined at any number of menu/advertisement display devices.

3. Processes

Figure 10:
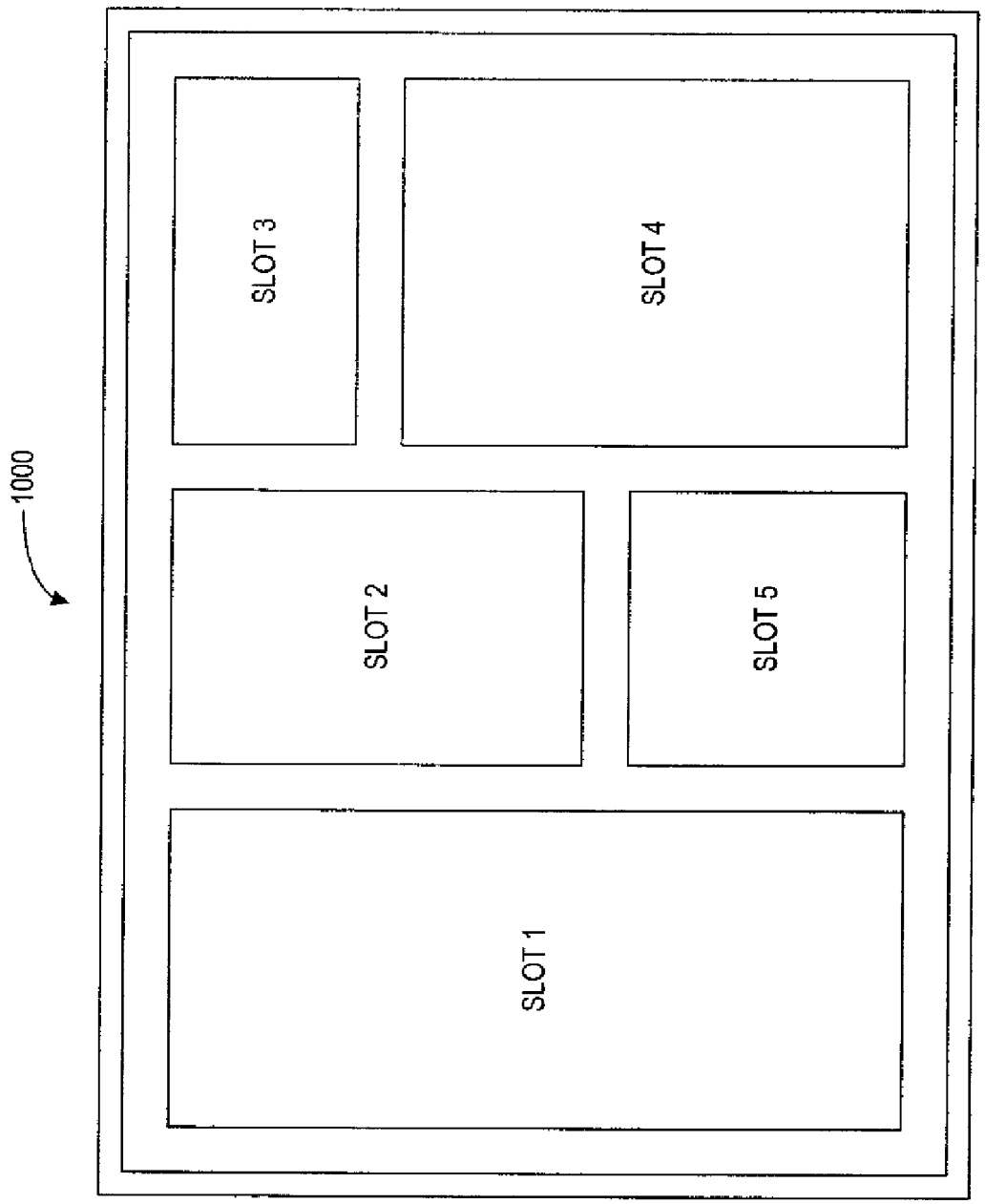
FIG. 10 shows a block diagram of an exemplary display that is consistent with at least one embodiment of the present invention.

FIG. 10 is an exemplary display 1000 of a digital menu board or other menu/advertising display device 110. The display screen 1000 includes a number of display areas or presentation slots 1-5, each defining an area of the display screen 1000 for displaying various types of information, as discussed herein. Those skilled in the art will understand that the display screen may include any number of presentation slots. Presentation slots may be embodied, for example, as respective display devices (e.g., cathode ray monitors), respective "windowed" or "split screen" display elements, or any combination thereof. For example, the display 1000 may comprise a plurality of flat panel display monitors. In another example, slot 1 may comprise one flat panel display monitor and slots 2-5 may be windowed display elements of another display monitor.

Figure 11:
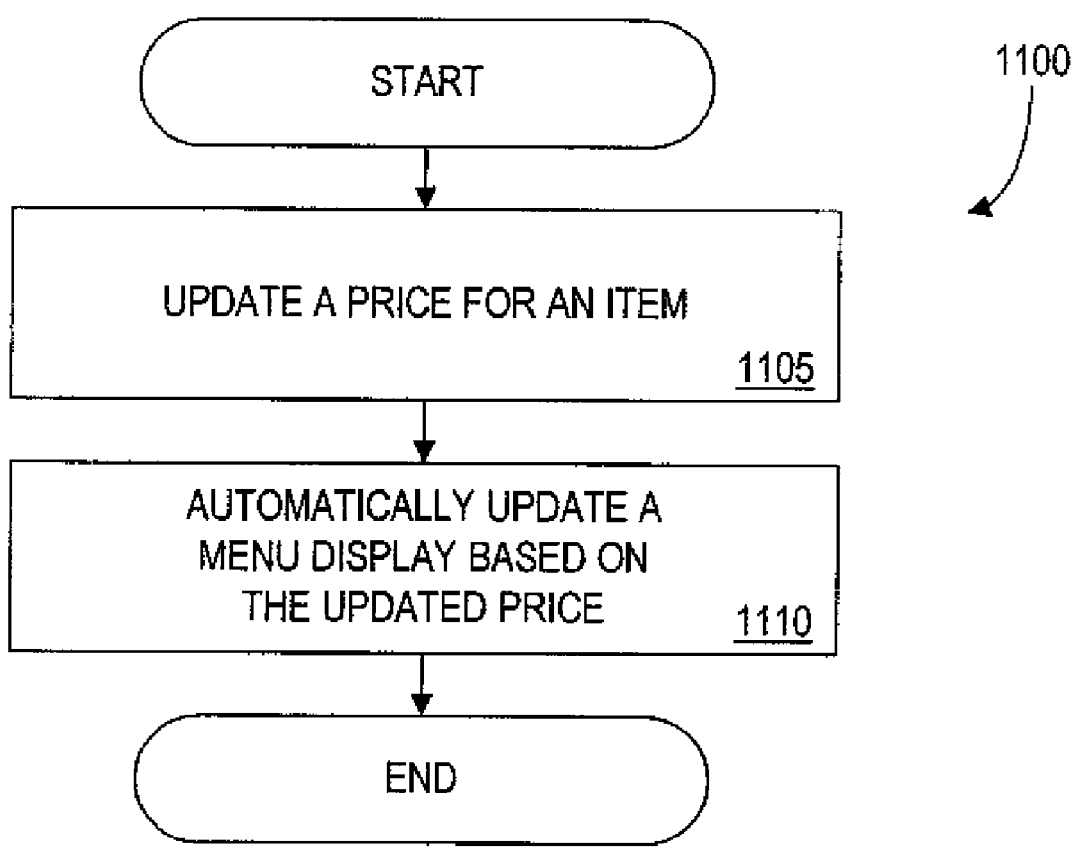
FIG. 11 is a flowchart of an exemplary process that is consistent with at least one embodiment of the present invention.

Referring to FIG. 11, a flow chart 1100 represents one embodiment of the present invention that may be performed by the POS server 105, for example, in synchronizing information used in a retail establishment.

The particular arrangement of elements in the flow chart of FIG. 11, as well as the other flow charts discussed herein, is not meant to imply a fixed order to the steps; embodiments of the present invention can be practiced in any order that is practicable.

At step 1105, a price is updated for an item. For example, a price of an item may be updated dynamically based on revenue management information. At step 1110, a menu display is automatically updated based on the updated price of the item. For example, an indication of the updated price may be transmitted from a POS server to a digital menu board. The automatic updating may take place at substantially the same time that the price is updated, according to a schedule, or at any time.

Such an embodiment can be advantageous, for example, by allowing updated price information (e.g., as may be stored in a POS database) to be propagated to one or more digital menu boards so that displayed information is consistent with information utilized by the point-of-sale system (e.g., in conducting transactions).

In an alternative embodiment, a set of items available for sale is updated. For example, an available menu may be updated based on transaction volume, revenue management information, and/or other types of information, to add, remove, or modify which items are presently available for sale. Then, a display of a menu/advertisement device is updated based on the updated set of items available.

Some embodiments of the present invention provide for (i) updating information displayed at a digital menu board (e.g., a menu, an advertisement) based on revenue management information and (ii) updating information (e.g., currently available menu item descriptions and prices, offers) for use by one or more devices in a point-of-sale system based on the revenue management information. According to various embodiments, the respective updating of information may take place at substantially the same time, after a predetermined lag, in accordance with a schedule, or at any time.

For example, several potential and currently available menu items may be evaluated according to any of a variety of factors, including transaction volume, popularity with customers, speed of service, and profit. Pricing and availability information for one or more items may be updated in the POS system based on the evaluation. For instance, one or more items may be removed from a menu, and/or one or more items may be added based on one or more rules. These changes to the available menu are then disseminated conveniently to one or more display devices (e.g., digital menu boards, POS terminals, customer display devices, self-ordering stations).

Figure 12:
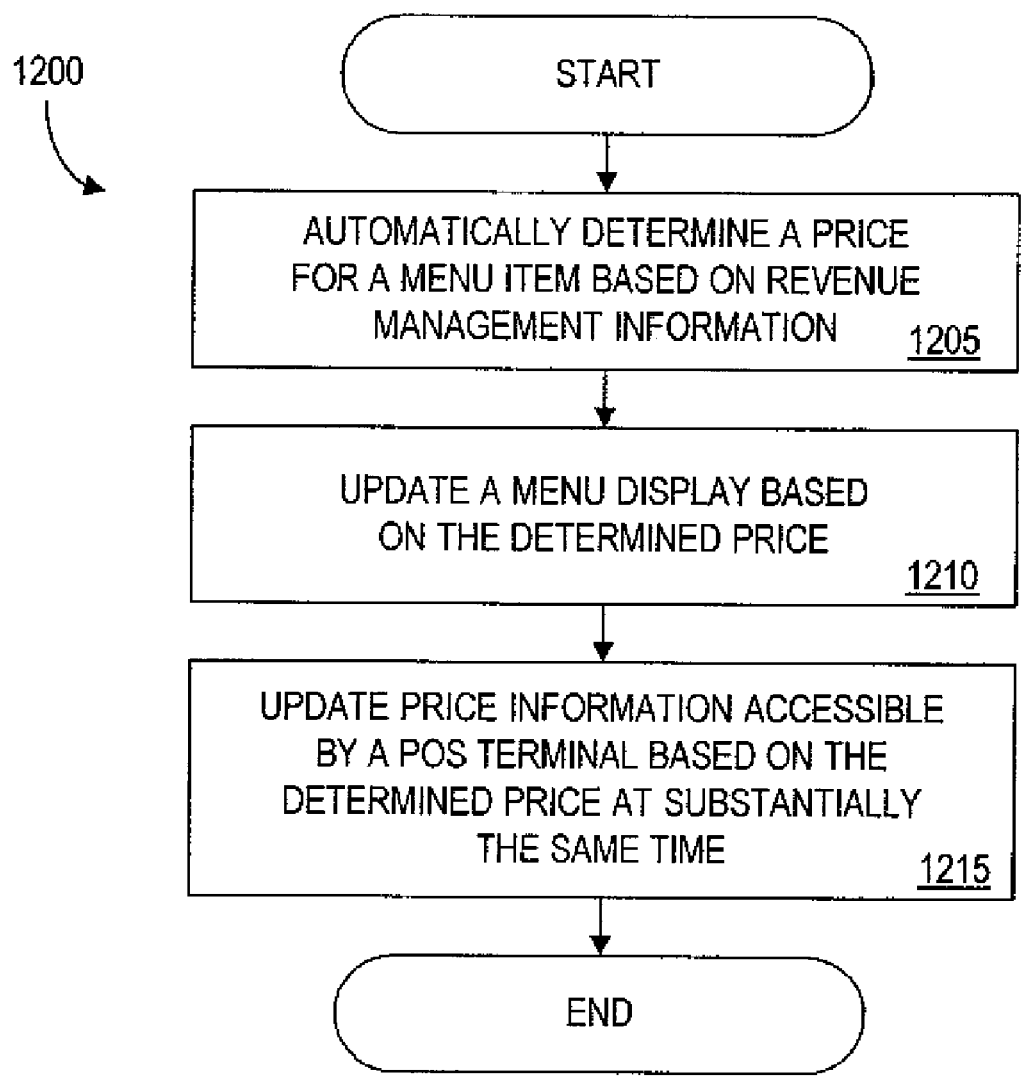
FIG. 12 is a flowchart of an exemplary process that is consistent with at least one embodiment of the present invention.

Referring to FIG. 12, a flow chart 1200 represents an embodiment of the present invention that may be performed by a central server to update information at one or more POS terminals and one or more types of menu advertisement display devices.

At step 1205, a price for a menu item is automatically determined based on revenue management information. Optionally, step 1205 may comprise receiving or otherwise determining the revenue management information. At step 1210, a menu displayed at a digital display board is updated based on the automatically-determined price for the menu item. At substantially the same time as the menu display is being updated, at step 1215, price information for the menu item that is for use by a point-of-sale terminal is updated based on the automatically-determined price for the menu item. For example, step 1215 may comprise simply updating a POS database that is accessible by one or more POS terminals. In another example, an indication of the updated information may be transmitted to one or more POS terminals.

According to an exemplary embodiment, a POS server receives a product look-up number (PLU). The POS server receives an indication of a price associated with the PLU. For example, such information may be entered via a computer terminal and/or received from a remote computer, such as corporate headquarters server 180. As will be readily understood, a PLU is typically used as a unique identifier that identifies a particular product or service.

The server may store the received price in association with the PLU (e.g., in a POS database record corresponding to the PLU). Optionally, as discussed variously herein, the price may be updated.

The price is transmitted to a digital menu board (e.g., for display in a menu). For example, a request may be made by a device (e.g., a POS terminal) in a restaurant network for the price (e.g., by sending the PLU), and the server may look up the price in the POS database.

In another example, an automated data synchronization process retrieves the price in accordance with a schedule or at any appropriate time (e.g., based on various types of factors discussed herein). In yet another example, a digital menu board sends a request for current price information to the POS server.

Some types of point-of-sale systems allow for different pricing for the same item depending on the time of day. For example, some restaurants schedule a change in the price of an item from a first price amount to a second price amount based on a schedule. A price change, especially a price increase, understandably may cause dissatisfaction for some customers. For example, a customer reviews a displayed menu while on line to make a purchase, and expects to pay $2 for a desired item based on the menu display. Before or upon reaching the point-of-sale terminal, however, the customer finds out that the price has increased to $3. Various embodiments of the present invention may be advantageous in improving sales and customer satisfaction by managing a delay or time lag between price changes at the point of sale and at a digital menu board.

Some embodiments provide for a time lag after a price is raised on the menu/advertisement board before the new price is reflected in transactions with the point-of-sale system. For example, if the displayed price for a sandwich is raised on a digital menu board, the lower price remains active at the register for a period of time (e.g., four minutes). The time lag will preferably be of such duration as to ensure that most or all of the customers who might have viewed the lower price on the menu board would not be charged the new, higher price once they reached the point-of-sale terminal.

Figure 13:
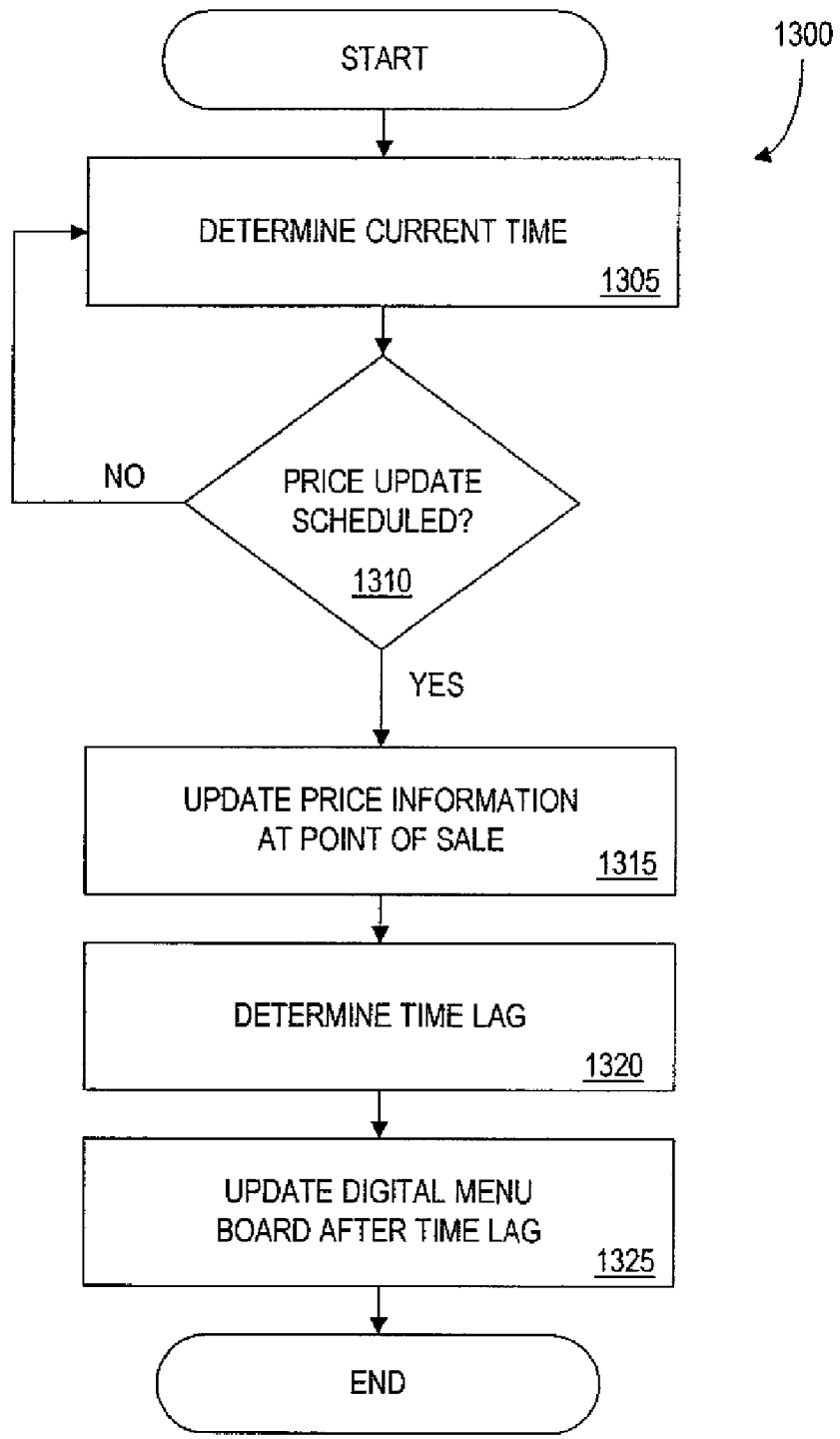
FIG. 13 is a flowchart of an exemplary process that is consistent with at least one embodiment of the present invention.

Referring to FIG. 13, a flow chart 1300 represents an embodiment of the present invention that may be performed to update retail information with a delay between the time information is updated at one location (e.g., a POS terminal) and then updated at another (e.g., a digital menu board).

In step 1305, the current time is determined. In step 1310, a determination is made as to whether a price information update is scheduled for the current time. If an update is scheduled, information is updated at a point-of-sale terminal (step 1315). Otherwise, the process ends, or optionally returns to 1310 to start the process again. At step 1320, a time lag for updating displayed content at a digital menu board is determined.

As discussed herein, the time lag may be predetermined or determined dynamically, and may be of no or of negligible duration. After the determined amount of time since the point-of-sale terminal was updated, the updated information is transmitted to the digital menu board (step 1330).

Alternatively, or in addition, some embodiments provide for a time lag after price changes in the point-of-sale system before updating displayed content on a menu/advertisement board.

It will also be readily understood that delays in the synchronization of retail information may be used for more than just price information. For example, some types of restaurants change the menu items available at different times of day. Thus, some embodiments of the present invention would allow for a delay after updating a digital menu board with the new menu before updating the point-of-sale system to reflect the available menu choices.

According to some embodiments of the present invention, the period of time to delay may be determined based on a variety of factors. The time lag may be predefined (e.g., four minutes). In some embodiments, the time lag may be based on the number of transactions being processed and/or based on the number of waiting customers. For instance, if no transaction are being processed at the point-of-sale terminals, the system may determine that there should be no time lag at all. Accordingly, the digital menu hoard and the point-of-sale system would be updated at substantially the same time.

According to some embodiments of the present invention, a digital menu board receives a PLU. The digital menu board receives a price associated with the PLU. For example, the received price may be a new price received from a POS server in accordance with a synchronization process. The received price may be stored, for example, in a POS database record corresponding to the PLU, as discussed above.

The received price is displayed (e.g., using a display screen of a digital menu board). In some embodiments, the received price is an updated price to replace another price associated with the PLU. For example, as a result of a pricing change by the POS server, the price of a food item may be discounted. The new lower price is then used to update the display at the digital menu board, for example. Preferably, the received price is displayed in a manner that indicates the price is associated with a particular item (e.g., by also providing a description or image of the product corresponding to the PLU).

According to some embodiments of the present invention, the display of one or more menu or advertisement items may be adjusted (e.g., in response to entering and/or removing an item) so that any displayed items fill up the available display space of a digital menu board (or a defined portion thereof). For example, the size and font of displayed menu items may be adjusted to make better use of available display area. Thus, some aspects of the present invention may include graphical rendering and presentation functionality similar to that found in presentation software such as Microsoft® Powerpoint®. According to one example scenario involving such embodiments, a restaurant presently has six side items displayed on a digital menu board (e.g., macaroni and cheese, baked beans, etc.). Each side item has a displayed text description in seventy-point font and an associated four-inch image of the item. The restaurant decides to add three more side items to its menu, but would like all of the nine items to be displayed evenly on the screen. In accordance with some embodiments of the present invention, the exemplary system is configured such that after the three new side items are added to the menu, each of the nine side items will be displayed on the display screen using forty-five-point font and a three-inch picture.

One or more embodiments of the present invention provide for a display slot determination process that may be performed, for example, by a digital display system (e.g., comprising an electronic menu board and/or customer display device). The digital display receives one or more item descriptors to be used to fill one or more display slots. For example, a digital menu board may have only one display area but might have two or more display areas. An item descriptor may comprise, for example, one or more of a food item price, a food item text description, a food item image, and an audio message. The digital menu board determines an optimal size at which to display the item descriptors. The determination may be based, for example, on the items (e.g., the type of items), the descriptors (e.g., the type of content to be displayed, the number of item descriptors to be displayed), and/or the available display space (e.g., the number of display slots, the dimensions of a particular display slot). The digital menu board displays the optimally-sized item descriptors in a display slot (e.g., of a digital menu board).

Figure 14:
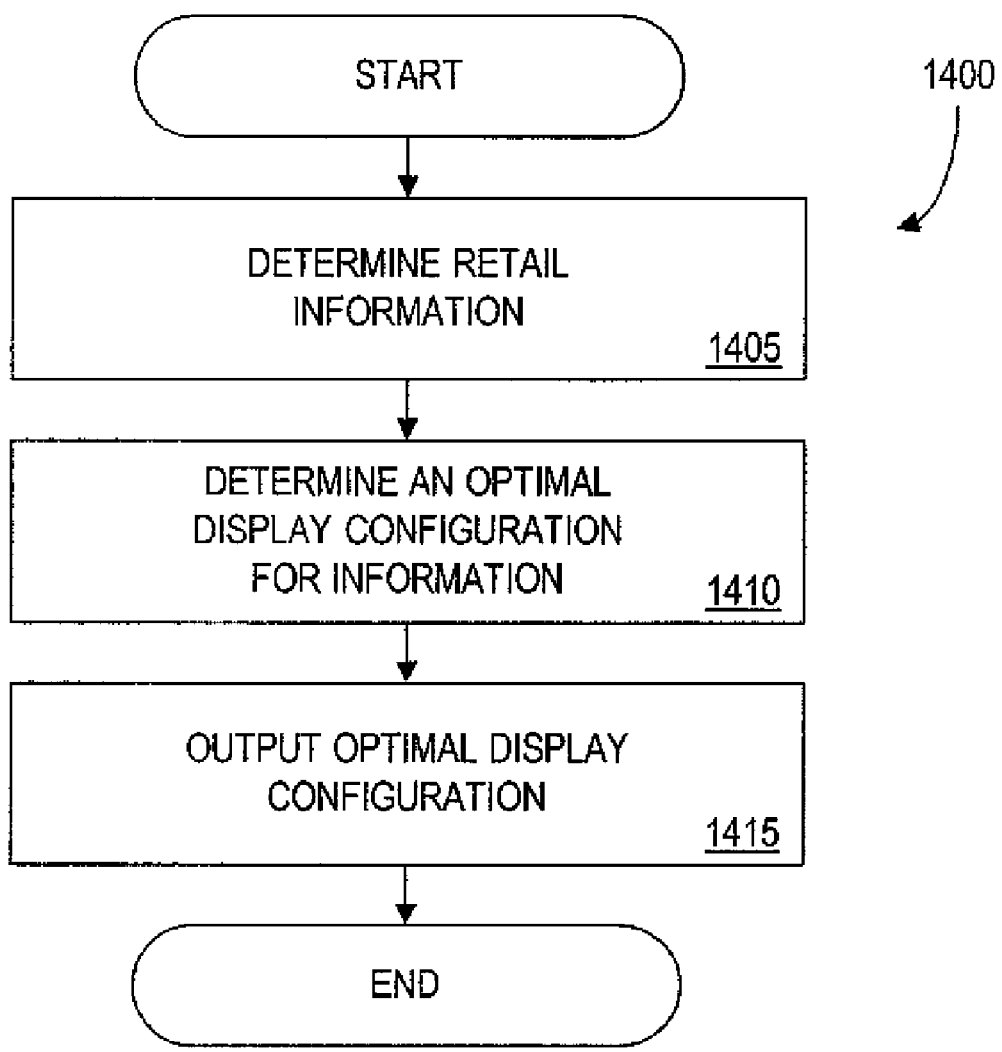
FIG. 14 is a flowchart of an exemplary process that is consistent with at least one embodiment of the present invention.

Referring to FIG. 14, a flow chart 1400 represents an embodiment of the present invention that may be performed to determine an optimal layout for information displayed on a digital menu board. Such a process may be performed, for example, by a POS server and/or menu/advertisement display device.

In step 1405, retail information (e.g., advertising, price and/or product information) is determined. In step 1410, an optimal display configuration for a digital menu board is determined. For example, as discussed herein, an optimal number of items to display, an optimal slot (or slots) for the information, and/or optimal display characteristics such as image and text size may be determined based on variety of factors. For example, determination of the optimal display configuration may comprise referring to upsell/advertisement slot database, advertisement/upsell type database, and/or menu slots database in order to determine an optimal configuration for information including advertisements, upsell offers, and menu items. In step 1415, the optimal display is output. For example, the information is output at one or more designated presentation slots of one or more digital menu boards.

One or more embodiments of the present invention provide for the generation, management, and/or display of combo items. A combo item, as will be readily understood by those of skill in the art, is typically a combination of two or more items (e.g., a food item and a beverage item), and may be priced at a discount from the sum of the individual prices of its component items. Regardless of pricing considerations, a combo item may be useful in expediting the ordering process by allowing an customer to identify the combo item (e.g., "Meal #5") instead of having to name its individual components.

According to some embodiments of the present invention, a system is configured with the functionality to analyze the historical transactions of a retail establishment and, based on the analysis, assemble combinations of items for sale.

According to some embodiments of the present invention, a combo item may be created (e.g., dynamically) based on revenue management information, order history, and other types of retail information. For example, a combo of two items may be determined dynamically based on information that a food item historically is very popular and a particular dessert item is overstocked. Some embodiments of the present invention allow for a determination of how presently and/or previously available combo items have performed (e.g., based on transaction history), and may indicate that one or more combo items should be added, removed, or modified. Once it is determined what combo item (or set of combo items) are to be made available for purchase, at least one embodiment of the present invention provides for updating the display of a menu/advertisement board to indicate the available combo items.

Some embodiments of the present invention provide for an integrated retail information and display system operable to establish, remove, and modify combo items dynamically, and also to have one or more display devices updated (e.g., substantially simultaneously, after a predetermined lag) to indicate visually (e.g., by listing in a menu, via a video advertisement display) items currently available for purchase.

As discussed herein, some embodiments allow for the determination or adjustment of a price for an item (e.g., based on price management information), and it will be understood that such systems and methods may also be used to determine pricing for one or more combo items.

Figure 15:
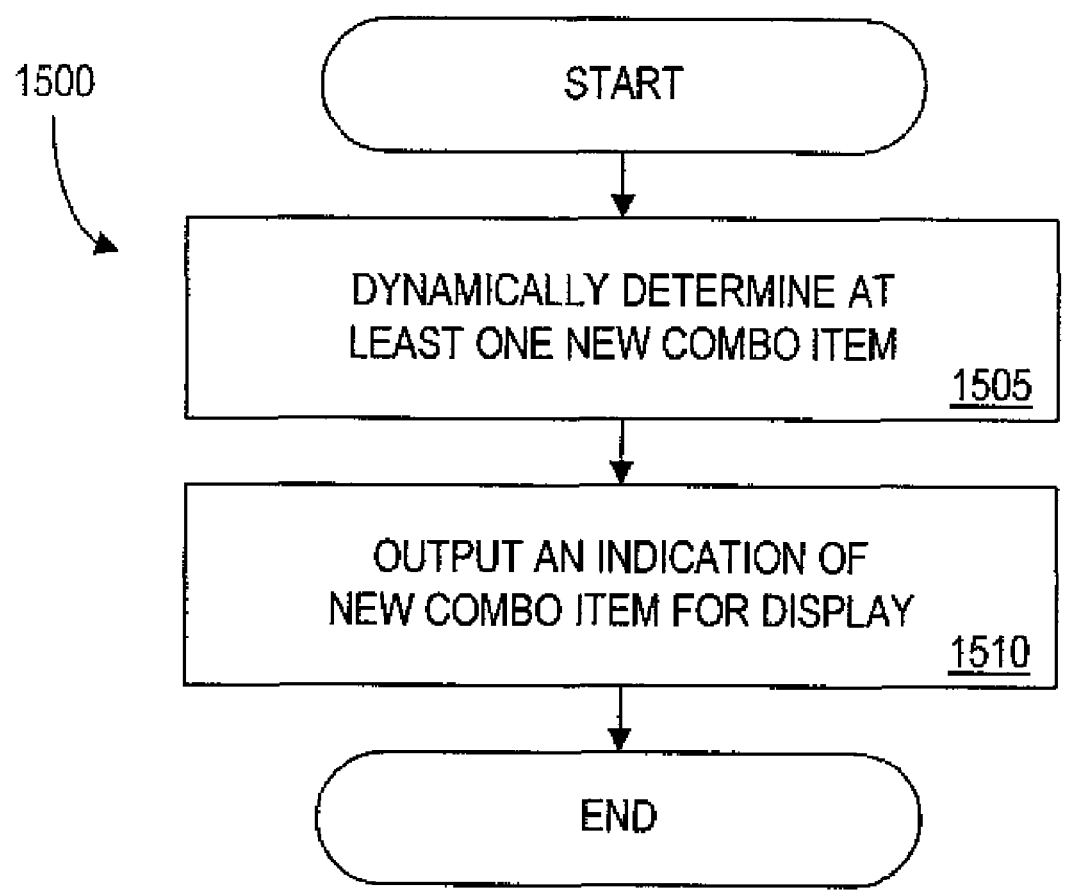
FIG. 15 is a flowchart of an exemplary process that is consistent with at least one embodiment of the present invention.

Referring to FIG. 15, a flow chart 1500 represents an embodiment of the present invention that may be performed to assemble a combo meal item or other type of combo item. Such a process may be performed, for example, by a POS server.

At step 1505, at least one new combo item is determined dynamically based on transaction information. At step 1515, an indication of the at least one new combo item is output for display. For example, a text description of a new combo item and an image of the new combo item is transmitted to a digital menu board for including in a menu display. Optionally, as discussed herein, an appropriate presentation slot may be determined for the new combo item. The new menu item may be displayed at substantially the same time that the new item is determined. In this way, a restaurant or other retail establishment may dynamically update a digital menu board based on newly-assembled combo items. Such embodiments may be advantageous in responding to changes in customer purchasing preferences more quickly, and in providing menu changes and new advertisements more quickly.

In an example consistent with various embodiments of the present invention, a restaurant system dynamically assembles new combo meals based on an analysis of common transactions. For instance, if the system determines that 5% of customers order a three-piece chicken strip item, a side of baked beans, two biscuits, and a cheesecake, the system could create a new combo meal item including those items and display the new item on a digital menu board. The entry keys on one or more point-of-sale terminals could also be updated automatically in accordance with any newly-determined combo meal items.

Various embodiments of the present invention provide for a method and system operable to assemble one or more new combo meal items. According to some embodiments, a point-of-sale terminal and/or restaurant server is operable to analyze sales information (e.g., order history) to determine common food item combinations ordered by customers. For example, based on transaction history, the restaurant server may compile one or more sets of PLUs, each set corresponding to a combination of items ordered by a customer. The server may then determine which combinations are the most common.

Based on the determined food item combinations, the system may then assemble one or more new combo meals. For example, the system may select one or more of the above-mentioned most common sets of PLUs for a new combo meal.

Optionally, a price for one or more of the new combo meals is also determined. For example, the respective prices for each of the component items may be looked up based on the components' PLUs. A price for the new combo item may then be determined based on one or more of these component prices. It may be preferred to offer the combo meal at a price that is less than the sum of the prices of its components.

In some embodiments, a new PLU or other type of identifier is also selected or created to identify the new combo meal. The new PLU may then be stored, for example, in a menu item database.

As discussed herein, some embodiments of the present allow for determining an optimal display slot for displayed content. Accordingly, an optimal display configuration and/or display slot may be determined for a new combo meal item. For example, the addition of a new combo meal item to a designated combo meal display area may include reducing the image size of the images associated with the combo meals displayed in that area. In another example, an optimal number of combo meals to present and/or an optimal number of slots to use to display combo meals may be determined. An indication of any new combo meals to be displayed may then be output to a digital menu for display.

At least one embodiment of the present invention provides a digital menu board operable to receive an indication of one or more new combo meals. An optimal number of combo meals to present and/or an optimal number of slots to use to display combo meals is determined. The optimal number of new combo meals is then displayed in the identified display slots.

Various additional or alternative embodiments of the present invention allow for performing one or more of: (i) assembling a digital image of component items of a combo item (e.g. creating a combo meal image depicting a sandwich, beverage, and side item); (ii) generating a combo item price based at least in part on the components' retail prices, and (iii) offering the combo item on a menu/advertisement board.

In some embodiments, a system could take an electronic image of each component item (e.g., food item) and assemble them into a displayed combination on a menu/advertisement board (e.g., as a composite image, as a grouping of the respective images). For example, a new combo meal item could be displayed using a composite image of the food items in a menu and/or as a video advertisement for the new combo item.

Some embodiments provide for a point-of-sale terminal to update its configuration of PLU keys based on the received PLU key corresponding to a new item, such as a new combo meal.

According to some embodiments, one or more menu buttons on a touch screen of a point-of-sale terminal or self-ordering kiosk could be updated to reflect any dynamic combo item changes. In this way, a customer or point-of-sale operator in a restaurant, for example, may easily select from among one or more dynamically-determined combo food items.

In accordance with some embodiments, one or more keys of a point-of-sale terminal and/or self-ordering kiosk may be updated in accordance with any new combo meals. For example, as will be understood by those skilled in the art, some types of terminals use entry keys that correspond to respective meal items (e.g., a key is mapped to a particular PLU). In accordance with some embodiments of the present invention, a new PLU key is generated for a new combo meal, and the new key is output to a point-of-sale terminal.

According to various embodiments of the present invention, an adaptive and/or rules-based system could be used to determine the best times to put one or more items on sale (and/or when to raise a price). For instance, if a system forecasts that customer traffic will be slow in a restaurant for specific times of day and/or days of week, the system could lower prices on all or some of the menu items by 5% during those times. As discussed variously herein, once adjusted, the displayed prices of menu items could then be updated accordingly on a digital menu board. Adjusted prices (e.g., new menu item prices) may be displayed on a menu/advertisement board (e.g., digital menu board) alone or next to a "usual" (e.g., previous) price.

Alternatively or in addition to determining when to change a price, some embodiments allow for (i) determining an amount to lower or raise a price (e.g., based on forecasted inventory), and (ii) determining which items should have their prices changed.

Various embodiments provide for the display at a digital menu board to be dependent on inventory and/or kitchen systems. For example, in response to a determination of excess inventory or pre-made items, the digital menu board could indicate that those items are on sale. In some cases, pre-made food items, for example, could be free if inventory allows. Additionally, items can be offered for free at random in order to excite customers.

In one example consistent with one or more embodiments, if a quick server restaurant's point-of-sale system indicates that there are forty apple pies either in inventory or assembled, the point-of-sale system can dynamically determine to put the apple pies on sale. As discussed variously herein, corresponding digital advertisements for the pies could then be displayed on the customer display devices as well as on the digital menu board. Optionally, one or more of the various types of display devices could indicate a "countdown," such as "Only 5 pies left at the low $0.50 price!" or "Only 2 minutes remaining to get your free apple pie with meal purchase!"

According to some embodiments, a system configured so as to update a digital menu board display based on point-of-sale and/or inventory information would remove a displayed item from the digital menu board if there is no more inventory for that item.

In accordance with at least one embodiment of the present invention, a system is provided that is operable to change price information (e.g., dynamically) based on inventory and/or on a quantity of assembled items. The system may comprise a point-of-sale terminal and/or restaurant server, for example. The following exemplary functionality is described as being related only to inventory information, but it will be understood that other types of information (e.g., a number of items assembled) may be used in lieu of or in addition to inventory information.

According to an exemplary embodiment, information about inventory is retrieved from a database (or otherwise determined). For example, a restaurant server may retrieve information about current inventory of one or more types of items from an inventory database.

It is determined whether the inventory exceeds a predetermined maximum quantity. For example, an inventory database may include a field specifying a maximum quantity of an item to hold before initiating a sale of the item.

If the inventory exceeds the maximum quantity, in some embodiments the system determines a sale price for the item. For example, if more than twenty ice cream sandwiches are in inventory, the system determines to lower the price from $2.40 to $0.99. In some embodiments, the sale price may be predetermined (and stored in a database record corresponding to the item, for example). In other embodiments, the sale price may be determined dynamically based on any of a variety of factors, as discussed herein. According to some embodiments, if the inventory exceeds the maximum quantity, an advertisement is selected or generated that may or may not incorporate a sale price. For example, it may be desired to increase advertising for the item without lowering the price.

An offer/advertisement for the item is output. For example, an offer (e.g., a menu listing) and/or advertisement for the item (e.g., an audio/video promotion) incorporating a determined sale price is output to a digital menu board.

According to some embodiments of the present invention, a digital menu board is operable to receive an indication of a sale price and/or advertisement for an item. For example, an inventory of the item or a number of items assembled (e.g., sandwiches in a quick-serve restaurant) may have exceeded a maximum quantity, as discussed above. A sale price may have been determined for the item. The digital menu board displays the sale price and/or advertisement for the item.

As described above, pricing may be adjusted based on inventory, a quantity of item assembled, and/or other types of information. In another exemplary embodiment, pricing information may be changed based on sales velocity or other measure of transaction volume.

For example, a restaurant server or other device of a point-of-sale server determines a transaction volume of one or more items. Based on the determined transaction volume, an adjusted price is determined for at least one item. For example, the transaction volume of one item may prompt a pricing change for that item and/or for one or more other items. In some embodiments, the new price is associated with the item, for example, by changing the price in a field of a record corresponding to a product's PLU (e.g., in the POS database). In this way, PLU pricing can be adjusted based on transaction volume.

In some embodiments, an indication of the price determined based on the transaction volume is output. For example, an indication of the adjusted price is transmitted to a digital menu board for display to customers.

According to some embodiments, a system comprising at least one display device is provided for displaying a price adjusted based on transaction volume. For example, an indication of adjusted PLU pricing for one or more items is received at a digital menu board, in which the new pricing is based on transaction volume. The new pricing information is displayed by the digital menu board, for example, by updating a menu or incorporating the adjusted pricing in an advertisement or offer.

A system useful for collecting and analyzing information about transaction volume, and for taking various actions based on rules related to transaction volume, in accordance with the present invention, is disclosed in pending U.S. patent application Ser. No. 10/403,184, filed Mar. 28, 2003, entitled "METHOD AND APPARATUS FOR MANAGING AND PROVIDING OFFERS," the entirety of which is incorporated herein by reference as part of the present disclosure.

For example, information about transaction volume may be maintained in a transaction volume database (not shown). A transaction volume database may include a number of records or entries, each defining a transaction volume during a time period. Those skilled in the art will understand that the transaction volume database may include any number of entries. A tabular representation of a transaction volume database may define fields for each of the entries or records. The fields may specify: (i) a time period and (ii) the transaction volume, represented in terms of sales per register per hour or items per hour per register. Any other representations of transaction volume may be used as desired.

In some embodiments, it may be preferred to track the transaction volume for an item or type of item.

Information about transaction volume rules may be maintained in a transaction volume rules database (not shown). A transaction volume rules database may include a number of records or entries each defining a rule applicable at a particular transaction volume (and optionally for a given item or category of items). Those skilled in the art will understand that a transaction volume rules database may include any number of entries. A tabular representation of a transaction volume rules database may define fields for each of the entries or records. The fields may specify, for example: (i) a minimum transaction volume, which is preferably represented as items or dollars of sales per hour; (iii) a discount amount by which to lower the price of one or more items (or types of items) if the transaction volume is less than the minimum transaction volume.

Many other representations of transaction volume besides sales per hour may be used as desired. Similarly, many other representations of rules associated to particular transaction volume may be used as desired.

If a retail establishment runs out of an item in inventory (or out of an ingredient for the item), it may be advantageous to update a digital menu board, self-ordering kiosk, and/or other display means in order to remove that item as a displayed choice. In this way, a customer is less likely to order an out-of-stock item, and may even be prevented from ordering an out-of-stock item if the item is not available as a menu choice (e.g., at a self-ordering kiosk). This may increase customer satisfaction with the transaction process and may also expedite the transaction process by reducing the ordering of out-of-stock items.

Some embodiments of the present invention provide for removing out-of-stock items from display on a digital menu board or other display means. A point-of-sale terminal and/or restaurant server, for example, determines if an item is out of stock. For example, an inventory database may be queried to determine the current number of an item in stock. If an item is out of stock, a request is transmitted to a digital menu board or other display device to remove that item from display. The request may comprise an indication of the item to be removed (e.g., a PLU) and/or a signal operable to instruct the display to remove the item from display. According to some embodiments, offers, menu listings, and/or advertisements including the out-of-stock item may be removed or modified to remove the item from display. Although the process was described above as being related to an out-of-stock item (i.e., when inventory reaches zero), it will be readily understood that any predetermined minimum inventory level may be used in determining whether to remove an item from display.

According to some embodiments, a digital display system is operable to receive a request to remove one or more items from display. For example, a digital display system may comprise a communication port configured to receive from a restaurant server a PLU corresponding to an out-of-stock product, and a signal including a code or instruction to remove some or all content related to that PLU from display.

After receiving the request, the display system updates a display at one or more display devices to remove the content. For example, the display system may reconfigure a menu layout to remove a menu item. Optionally, the reconfiguration may include adjusting the display characteristics (e.g., font size, image size) of any remaining menu items to create an optimal display. The adjusted display content is output at one or more digital menu screens or other display devices.

According to at least one embodiment, a process is provided for providing an upsell offer to a customer. In an exemplary process, a restaurant server receives an indication of a customer order. For example, a customer gives her order to a point-of-sale cashier, who enters the order at a point-of-sale terminal. In another example, the customer provides her order at a self-ordering kiosk. The restaurant server determines whether an upsell offer should be provided to the customer via a digital menu board. In some embodiments, the restaurant server determines whether to provide an upsell offer.

In some embodiments, the determination as to whether to provide the offer and/or whether to provide the offer via a digital menu board is based on the customer order. If the upsell offer is to be made via a digital menu board, the restaurant server transmits an indication of the upsell offer to the digital menu board. In some embodiments, the restaurant server transmits a signal instructing the digital menu board to output a representation of the upsell offer.

Some embodiments of the present invention provide for a display device such as a digital menu board or customer display device to receive an indication of an upsell offer and display a representation of the upsell offer. For example, a digital menu board system may receive an offer code that corresponds to a particular upsell offer. The system may then retrieve display content corresponding to the offer/offer code, and display the corresponding content (e.g., a video/audio presentation of the offer).

One or more embodiments of the present invention provide for a system operable to update an offer/advertisement slot. According to some embodiments, a point-of-sale terminal and/or restaurant server determine an upsell/advertisement type. For example, a restaurant server may determine to output a particular advertisement, and identifies the type of advertisement. In another example, a server receives or otherwise determines a type of advertisement to display, and optionally determines an advertisement of that type to display (e.g., selected from a database of display content). An upsell/advertisement slot is also determined, for example, based on the determined type of upsell/advertisement. For example, it may be preferred to display video content at one particular slot of a digital menu board. In another example, content that is predominantly text-based might be displayed at a different slot and/or at a different display device. The upsell/advertisement is output at the determined slot. For example, an indication of the display slot and/or the content to be displayed is transmitted to a digital menu board.

According to one exemplary embodiment, a digital menu board is operable to receive an indication of a display slot and an indication of an upsell/advertisement. The upsell/advertisement is displayed at the indicated display slot.

According to some additional embodiments, an end user (e.g., a restaurant manager) is able to perform manual upgrades to a combined point-of-sale digital menu board system via either a "back office" server (e.g., a restaurant server located at a restaurant) or a remote server (e.g., a corporate server) in communication via a network with the local in-store server. For example, as discussed herein, any changes to product information (including price information) may be easily propagated to any POS and display devices.

According to some alternative embodiments, a customer provides information that identifies the customer. For example, a customer places an order at a point-of-sale terminal using a credit card or otherwise identifies himself. The customer identifier may be used, for example, to determine associated information (e.g., the customer's name, a date of birth, a preferred meal order) that may be stored, for example, in a customer database. After receiving the identifying information, a message based on the customer or customer information is displayed on a menu/advertisement board. For example, a restaurant's digital menu board may display a personalized greeting message such as "Welcome, Todd!" or "Happy Birthday!" to a customer conducting a transaction at a point-of-sale terminal.

Other types of customized information may be displayed using a menu/advertisement board such as a digital menu board. For example, a digital menu board could be used to display a list including the birthdays of regular customers or other types of customized messages and information.

Various embodiments of the present provide for a method for displaying a message, such as a greeting, to a customer. Many types of digital display systems comprise multiple devices (e.g., two or more flat panel display screens) and/or multiple display areas. The digital display system could use one or more of the displays to display messages to customers when prompted by the restaurant server. If no messages are being displayed, the display device could optionally display other types of content, such as advertisements and/or menus, as discussed variously herein.

In some embodiments, a method for providing a message may be performed, for example, by a restaurant server and/or a point-of-sale terminal. In one embodiment, a customer identifier is received by a restaurant server (e.g., from a point-of-sale terminal). Based on the received identifier, the server determines whether a message is to be provided to the customer. In some embodiments, (i) the message and/or (ii) whether to provide the message, is based on the customer identifier. For example, a message may comprise a greeting (e.g., "Hello, Steve!"), birthday greeting, or "Welcome Back!" message (e.g., if it is determined that the customer has not been in recently). In another example, a greeting may be provided to any identified customer, or only to customers meeting certain criteria (e.g., a frequent customer). Once a message is determined, an indication of the message, the customer identifier, and/or a signal to display a message is transmitted to a digital menu board or other display device.

Some embodiments of the present invention provide for a digital menu board to receive a signal from a restaurant server, the signal comprising at least one of (i) an indication of a message determined based on a customer identifier, (ii) a customer identifier, and (iii) an instruction to output a message (e.g., based on a customer identifier). After receiving the signal, the digital menu board displays a message. In some embodiments, a digital display system receives a customer identifier (e.g., from a point-of-sale system) and displays a message based on the customer identifier. For example, the digital display system may determine an appropriate message in a manner similar to that described above with respect to a restaurant server. In another example, the display system receives a code or other message identifier that identifies a particular message and displays a corresponding message.

According to at least one embodiment, a process is provided for offering a customer's regular order to the customer. The offer may be displayed to the customer via any of various types of display devices. For example, a customer's regular order may be displayed to the customer at a self-ordering station or customer display device at the point-of-sale. According to some embodiments, a customer identifier is received (e.g., a credit card account number). For example, the customer swipes his credit card at a card authorization terminal. A restaurant server, for example, determines whether there is a regular or preferred order associated with the identifier. For example, a transaction database may be queried to determine the customer's most common order. In another example, an indication of the customer's favorite or preferred order may stored and retrieved based on the customer identifier (e.g., from a corresponding record in a customer database). If a regular order is determined, an offer for the regular order is output. For example, if the customer's regular order is a hamburger with pickles and a medium soft drink, an offer for that order is displayed to the customer. Optionally, the exemplary method provides for determining if the offer is accepted and processing the transaction for the regular order if the offer is accepted.

According to some alternative embodiments, if the offer is not accepted, another offer may be determined based on the customer identifier. For example, another offer may be determined based on the customer's transaction history (e.g., a second most common order). According to some embodiments, two or more regular or preferred orders may be determined and offered to the customer at the same time (e.g., as a personalized menu).

In some embodiments, a customer may be offered the opportunity to purchase her regular order. For example, the system may store the customer's regular order (e.g., in association with the customer's credit card number or other identifier) and retrieve the regular order when the customer's credit card is swiped at the point-of-sale terminal. The system would output the regular order onto the digital menu board, customer device display, POS terminal, or the self-order entry kiosk, and ask the customer if she would like to place her regular order. The customer could select a "Yes" option, and the order would automatically be processed.

Establishing communication among digital menu boards, POS terminals, a restaurant or "back office" server, POS displays, and/or self-order stations or kiosks allows for additional functionality that may be appealing to some types of customers and operators of retail establishments.

According to some embodiments of the present invention, an upsell offer made to a particular customer on one type of advertising device (e.g., an advertising device at a point-of-sale terminal or at a drive-thru menu board) could be reinforced with related advertising on a menu/advertisement board. For example, it is known to present an offer (e.g., an upsell offer) to a customer at a display device situated in front of a point-of-sale terminal. In accordance with various embodiments of the present invention, an indication of the product being offered in the upsell offer could also be displayed at a digital menu board, such as might typically be located above and behind the point-of-sale terminal. For example, if an upsell offer was for a dessert item, a video advertisement for the dessert item could be displayed on the digital menu board, before, during, after, or at substantially the same time the offer is presented to the customer.

Some types of customers tend to look up or look away from an advertising device in front of a point-of-sale terminal while considering an offer, so a customer might view the advertisement on a digital menu board while considering the offer. Displayed content on a menu/advertisement board, such as an advertisement related to an offered product, may thus be advantageous in helping to motivate the customer to accept an offer. Similarly, a customer considering an offer presented via an advertising device at a restaurant drive-thru may view a related advertisement displayed on the drive-thru menu board.

According to some other embodiments, various types of display content (e.g., menu and/or advertisement information) could be displayed at a digital menu board, a POS display, a self-order entry kiosk, or any combination thereof. In some embodiments, content could be rotated among a plurality of displays. For example, content could be displayed alternately between a digital menu board and a POS display. A soft drink advertisement, for instance, could be presented on one type of display device, while the other type of display device presents the menu. The displays could then switch content (e.g., every two minutes).

What is claimed is:

1. A system comprising:
a data storage device;
a menu display; and
a processing mechanism coupled to said data storage device;
wherein the processing mechanism is operable to:
determine a reduction in price for an item from a first price to a second price, wherein said reduction in price is based at least in part on revenue management data stored in the data storage device;
automatically update a menu display of the item to show both the first price and the second price; and
update the menu display to provide an indication that the price of the item is temporarily reduced.

2. The system as recited in claim 1, wherein the processing mechanism is further configured to update the menu display to provide an indication as to a duration of the temporarily reduced price.

3. The system as recited in claim 2, wherein said duration is based on either a period of time or inventory level.

4. The system as recited in claim 2, wherein subsequent to expiration of said duration, said price for said item is restored from said second price to said first price.

5. The system as recited in claim 4, wherein subsequent to updating said menu display to indicate said price for said item is restored to said first price, a determined time lag is interposed prior to charging said restored first price for the item at a terminal.

6. The system as recited in claim 5, wherein said determined time lag is based at least in part on a predetermined period of time.

7. The system as recited in claim 5, wherein said determined time lag is based at least in part on a number of transactions being processed.

8. The system as recited in claim 5, wherein said determined time lag is based at least in part on a number of waiting customers.

9. The system as recited in claim 1, wherein said reduction in price is based at least in part on a time of day.

* * * * *